United States Patent
Vijayan et al.

(10) Patent No.: US 8,526,412 B2
(45) Date of Patent: Sep. 3, 2013

(54) FREQUENCY DIVISION MULTIPLEXING OF MULTIPLE DATA STREAMS IN A WIRELESS MULTI-CARRIER COMMUNICATION SYSTEM

(75) Inventors: Rajiv Vijayan, San Diego, CA (US); Gordon Kent Walker, Poway, CA (US); Raghuraman Krishnamoorthi, San Diego, CA (US); Murali R. Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 10/968,614

(22) Filed: Oct. 18, 2004

(65) Prior Publication Data

US 2005/0135308 A1    Jun. 23, 2005

Related U.S. Application Data

(60) Provisional application No. 60/559,740, filed on Apr. 5, 2004, provisional application No. 60/514,315, filed on Oct. 24, 2003.

(51) Int. Cl.
*H04B 7/288* (2006.01)

(52) U.S. Cl.
USPC ........... 370/344; 370/330; 370/208; 370/210; 370/478; 370/280; 370/281; 370/347; 370/349; 455/101; 455/456.1; 375/144; 375/148; 375/260; 375/299; 375/347

(58) Field of Classification Search
USPC ................. 370/330, 208, 210, 478, 280, 281; 455/101; 375/144, 148, 260, 299, 347
See application file for complete search history.

(56) References Cited

U.S. PATENT DOCUMENTS 5,404,355 A    4/1995 Raith
5,943,344 A    8/1999 Keller et al.
(Continued)

FOREIGN PATENT DOCUMENTS

CL    2710-2004    8/2005
CL    2714-2004    8/2005
(Continued)

OTHER PUBLICATIONS

K. Takamura et al, "Field Trial Results of a Band Hopping OFDM System", 1999, pp. 310-314.

(Continued)

*Primary Examiner* — Amancio Gonzalez
(74) *Attorney, Agent, or Firm* — Arent Fox LLP

(57) ABSTRACT

Techniques for multiplexing multiple data streams using frequency division multiplexing (FDM) in an OFDM system are described. M disjoint "interlaces" are formed with U usable subbands. Each interlace is a different set of S subbands, where U=M·S. The subbands for each interlace are interlaced with the subbands for each of the other M−1 interlaces. M slots may be defined for each symbol period and assigned slot indices 1 through M. The slot indices may be mapped to interlaces such that (1) frequency diversity is achieved for each slot index and (2) the interlaces used for pilot transmission have varying distances to the interlaces used for each slot index, which improves channel estimation performance. Each data stream may be processed as data packets of a fixed size, and different numbers of slots may be used for each data packet depending on the coding and modulation scheme used for the data packet.

87 Claims, 9 Drawing Sheets

(56) References Cited

U.S. PATENT DOCUMENTS

| | | | |
|---|---|---|---|
| 5,995,147 A | 11/1999 | Suzuki | |
| 6,088,326 A | 7/2000 | Lysejko et al. | |
| 6,424,678 B1 | 7/2002 | Doberstein et al. | |
| 6,515,960 B1 | 2/2003 | Usui et al. | |
| 6,545,997 B1* | 4/2003 | Bohnke et al. | 370/347 |
| 6,563,881 B1 | 5/2003 | Sakoda et al. | |
| 6,594,252 B1 | 7/2003 | Barany et al. | |
| 6,618,353 B2 | 9/2003 | Merrill et al. | |
| 6,721,267 B2* | 4/2004 | Hiben et al. | 370/206 |
| 6,801,580 B2 | 10/2004 | Kadous | |
| 6,810,006 B2 | 10/2004 | Michon et al. | |
| 6,853,629 B2 | 2/2005 | Alamouti et al. | |
| 6,873,607 B1 | 3/2005 | Hamada et al. | |
| 6,947,408 B1 | 9/2005 | Liberti et al. | |
| 7,058,005 B2 | 6/2006 | Ehrmann-Patin et al. | |
| 7,110,349 B2 | 9/2006 | Branlund et al. | |
| 7,171,160 B2 | 1/2007 | Chuah et al. | |
| 7,197,022 B2 | 3/2007 | Stanwood et al. | |
| 7,221,680 B2* | 5/2007 | Vijayan et al. | 370/441 |
| 7,317,680 B2 | 1/2008 | Ma et al. | |
| 7,366,462 B2 | 4/2008 | Murali et al. | |
| 7,782,810 B2 | 8/2010 | Han et al. | |
| 2001/0012292 A1 | 8/2001 | Merrill et al. | |
| 2001/0012322 A1 | 8/2001 | Nagaoka et al. | |
| 2002/0060984 A1 | 5/2002 | Michon et al. | 370/208 |
| 2002/0085486 A1 | 7/2002 | Ehrmann-Patin et al. | |
| 2002/0088005 A1 | 7/2002 | Wu et al. | |
| 2002/0105970 A1* | 8/2002 | Shvodian | 370/468 |
| 2002/0136170 A1 | 9/2002 | Struhsaker | |
| 2002/0142780 A1 | 10/2002 | Airy et al. | |
| 2002/0154705 A1* | 10/2002 | Walton et al. | 375/267 |
| 2003/0043928 A1 | 3/2003 | Ling et al. | |
| 2003/0086366 A1 | 5/2003 | Branlund et al. | |
| 2003/0156570 A1* | 8/2003 | Alamouti et al. | 370/347 |
| 2003/0189999 A1* | 10/2003 | Kadous | 375/349 |
| 2004/0136393 A1 | 7/2004 | Insua et al. | |
| 2004/0266351 A1 | 12/2004 | Chuah et al. | |
| 2005/0088959 A1 | 4/2005 | Kadous | |
| 2005/0122928 A1 | 6/2005 | Vijayan et al. | |
| 2005/0141475 A1 | 6/2005 | Vijayan et al. | |
| 2005/0174931 A1 | 8/2005 | Krishnamoorthi | |
| 2005/0249181 A1 | 11/2005 | Vijayan et al. | |
| 2006/0078001 A1 | 4/2006 | Chandra et al. | |
| 2006/0222108 A1 | 10/2006 | Cousineau | |
| 2008/0107192 A1 | 5/2008 | Mukkavilli et al. | |
| 2008/0186935 A1 | 8/2008 | Ling et al. | |
| 2008/0291860 A1 | 11/2008 | Vijayan et al. | |
| 2009/0175210 A1 | 7/2009 | Vijayan et al. | |

FOREIGN PATENT DOCUMENTS

| | | |
|---|---|---|
| CL | 2716-2004 | 8/2005 |
| CL | 2717-2004 | 8/2005 |
| CN | 1894876 | 1/2007 |
| CN | 1998212 A | 7/2007 |
| EP | 0829989 | 3/1998 |
| EP | 1041845 A1 | 10/2000 |
| EP | 1292061 | 3/2003 |
| EP | 1 388 954 A2 | 2/2004 |
| JP | 09219692 | 8/1997 |
| JP | 10066039 A | 3/1998 |
| JP | 10503894 T | 4/1998 |
| JP | 10173624 | 6/1998 |
| JP | 10191431 A | 7/1998 |
| JP | 2001223665 A | 8/2001 |
| JP | 2001308818 A | 11/2001 |
| JP | 2002111631 | 4/2002 |
| JP | 2002198929 | 7/2002 |
| JP | 2004531944 A | 10/2004 |
| JP | 2007525102 A | 8/2007 |
| KR | 20070048202 A | 5/2007 |
| RU | 2160508 | 12/2000 |
| TW | 510103 B | 11/2002 |
| TW | 531994 B | 5/2003 |
| TW | 550894 B | 9/2003 |
| WO | WO9210890 | 6/1992 |
| WO | WO9852380 | 11/1998 |
| WO | WO9955030 A1 | 10/1999 |
| WO | WO 0176110 A2 * | 10/2001 |
| WO | WO0182544 | 11/2001 |
| WO | WO0189099 | 11/2001 |
| WO | WO 02/09455 A2 | 1/2002 |
| WO | WO02009455 | 1/2002 |
| WO | WO0231991 | 4/2002 |
| WO | WO 02/49306 A2 | 6/2002 |
| WO | WO 02/087104 A2 | 10/2002 |
| WO | WO2005022811 | 3/2005 |
| WO | WO2005041515 | 5/2005 |
| WO | WO2005043310 | 5/2005 |
| WO | WO2005043794 | 5/2005 |
| WO | WO2005043829 | 5/2005 |
| WO | WO2005043855 | 5/2005 |
| WO | 2005112378 | 11/2005 |
| WO | WO2005112566 | 12/2005 |
| WO | WO2005114940 A1 | 12/2005 |
| WO | WO2005122627 | 12/2005 |
| WO | WO2006015268 A2 | 2/2006 |
| WO | WO2006069316 | 6/2006 |
| WO | WO2006086878 | 8/2006 |
| WO | 2006099222 | 9/2006 |
| WO | WO2006099323 A1 | 9/2006 |
| WO | WO2006138206 A1 | 12/2006 |
| WO | WO2007014360 | 2/2007 |
| WO | WO2007050921 | 5/2007 |

OTHER PUBLICATIONS

International Search Report-PCT/US04/035042, International Search Authority-European Patent Office-Mar. 24, 2005.

Written Opinion, PCT/US2004/035042, International Searching Authority, European Patent Office, Mar. 24, 2005.

International Preliminary Report on Patentability, PCT/US2004/035042, International Preliminary Examining Authority, United States, Jul. 15, 2008.

Sparmann U. et al: "On the Effectiveness of Residue Code Checking for Parallel Two's Complement Multipliers" 1 IEEE Transactions on Very Large Scale Integration (VLSI) Systems, vol. 4, No. 2, Jun. 1, 1996, IEEE Service Center Piscataway, NJ, US, ISSN: 1063-8210.

Fujita, et al., "Basic Transmission Performance of BDMA system", Technical Report of IEICE, Japan, The Institute of Electronics, Information and Communication Engineers, Apr. 22, 1999, vol. 99, No. 19, pp. 7-12.

Translation of Office Action in Japanese application 2006-525457 corresponding to U.S. Appl. No. 12/180,305, citing JP2002111631, JP10066039, FUJITA_ET_AL_VOL_99_NO_19_PAGE 7_12_year_1992, W002049306, W002087104, JP10503894, JP2001223665, JP10173624A and JP09219692. Dated Jan. 11, 2011.

"Taiwan Search Report—TW093132299—TIPO—May 7, 2011".

Taiwan Search Report—TW093132166—TIPO—Jul. 4, 2011.

Office Action dated Mar. 18, 2013 from related CN Application No. 200480038711.2.

\* cited by examiner

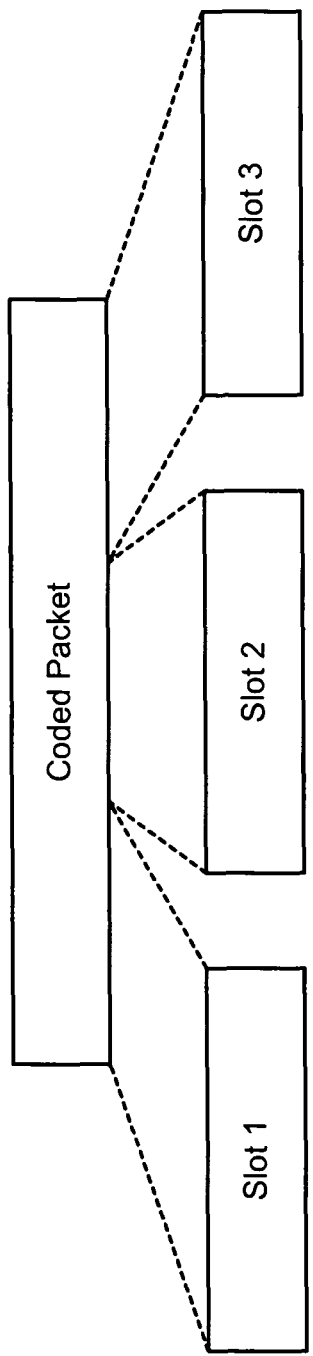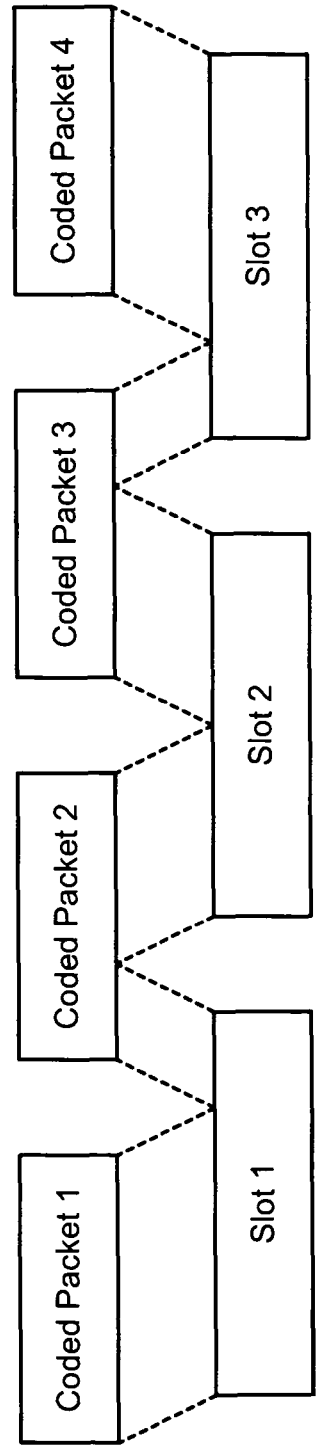
FIG. 8A
FIG. 8B

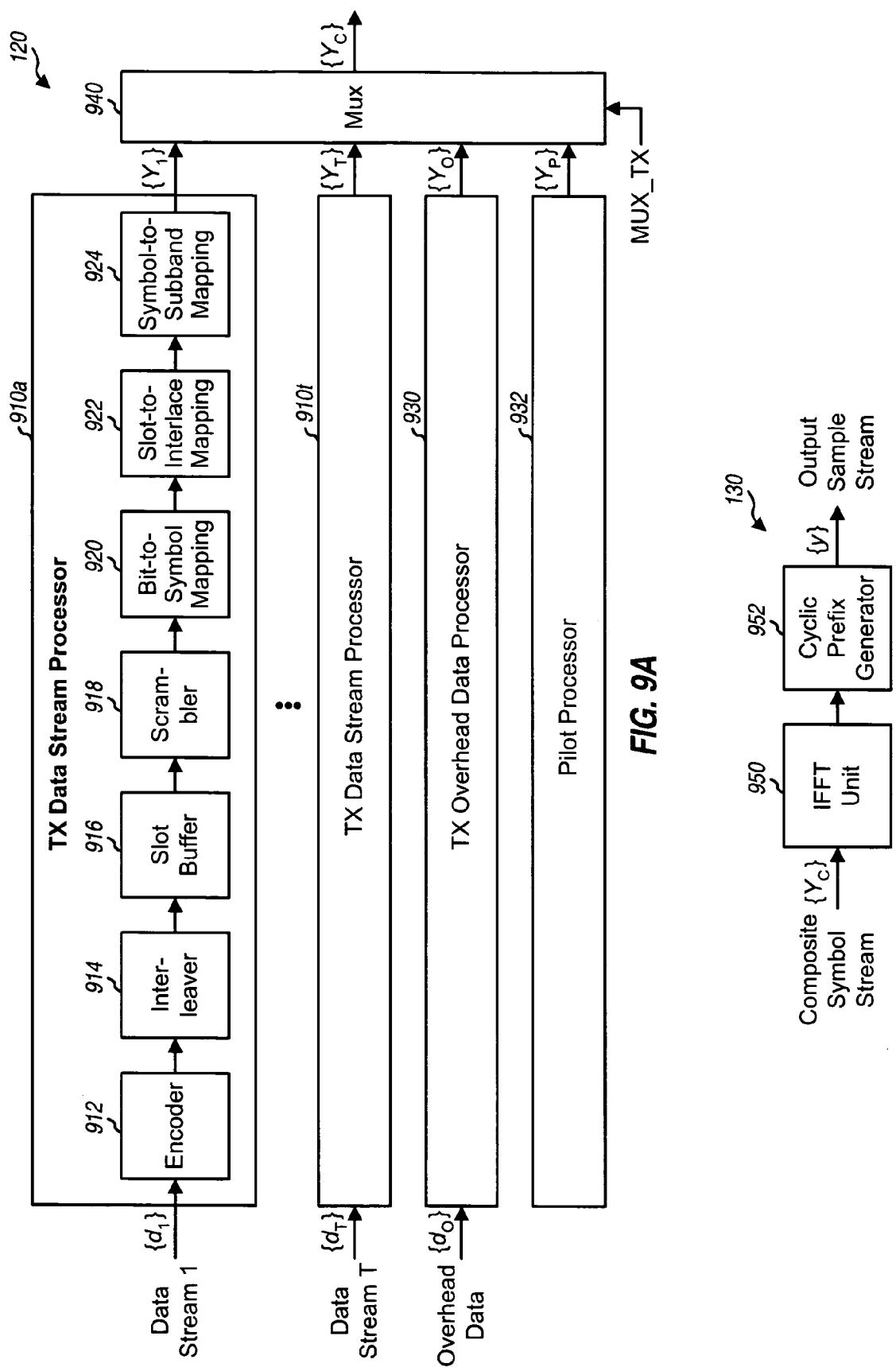

FREQUENCY DIVISION MULTIPLEXING OF MULTIPLE DATA STREAMS IN A WIRELESS MULTI-CARRIER COMMUNICATION SYSTEM

This application claims the benefit of U.S. application Ser. No. 10/932,586, entitled "A Method for Multiplexing and Transmitting Multiple Multimedia Streams to Mobile Terminals over Terrestrial Radio," filed Sep. 1, 2004, provisional U.S. Application Ser. No. 60/559,740, entitled "Multiplexing and Transmission of Multiple Data Streams in a Wireless Multi-Carrier Communication System," filed Apr. 5, 2004, and provisional U.S. Application Ser. No. 60/514,315, entitled "A Method for Frequency-Division Multiplex Various Multimedia Streams for Multicast Wireless Transmission to Mobile Devices," filed Oct. 24, 2003.

BACKGROUND

I. Field

The present invention relates generally to communication, and more specifically to techniques for multiplexing multiple data steams in a wireless multi-carrier communication system.

II. Background

A multi-carrier communication system utilizes multiple carriers for data transmission. These multiple carriers may be provided by orthogonal frequency division multiplexing (OFDM), some other multi-carrier modulation techniques, or some other construct. OFDM effectively partitions the overall system bandwidth into multiple (N) orthogonal frequency subbands. These subbands are also referred to as tones, carriers, subcarriers, bins, and frequency channels. With OFDM, each subband is associated with a respective subcarrier that may be modulated with data.

A base station in a multi-carrier communication system may simultaneously transmit multiple data streams. Each data stream may be processed (e.g., coded and modulated) separately at the base station and may thus be recovered (e.g., demodulated and decoded) independently by a wireless device. The multiple data streams may have fixed or variables data rates and may use the same or different coding and modulation schemes.

Multiplexing multiple data streams for simultaneous transmission may be challenging if these streams are variable in nature (e.g., have data rates and/or coding and modulation schemes that change over time). In one simple multiplexing scheme, the multiple data streams are allocated different time slots or symbol periods using time division multiplexing (TDM). For this TDM scheme, only one data stream is sent at any given moment, and this data stream uses all subbands available for data transmission. This TDM scheme has certain undesirable characteristics. First, the amount of data that may be sent in the smallest time unit allocable to a given data stream, which may be viewed as the "granularity" for the data stream, is dependent on the coding and modulation scheme used for the data stream. Different coding and modulation schemes may then be associated with different granularities, which may complicate the allocation of resources to the data streams and may result in inefficient resource utilization. Second, if the granularity for a given coding and modulation scheme is too large relative to the decoding capability of a wireless device, then a large input buffer may be required at the wireless device to store received symbols.

There is therefore a need in the art for techniques to efficiently multiplex multiple data streams in a multi-carrier communication system.

SUMMARY

Techniques for multiplexing multiple data streams using frequency division multiplexing (FDM) in a wireless multi-carrier (e.g., OFDM) communication system are described herein. In an embodiment, M disjoint or non-overlapping "interlaces" are formed with U subbands usable for transmission, where M>1 and U>1. The interlaces are non-overlapping in that each usable subband is included in only one interlace. Each interlace is a different set of S subbands, where U=M·S. The S subbands in each interlace may be selected from S' subbands that are uniformly distributed across the N total subbands and are evenly spaced apart by M subbands, where N=M·S' and S'≧S. This interlaced subband structure can provide frequency diversity and simplify processing at a receiver. For example, the receiver may perform a "partial" S'-point fast Fourier transform (FFT) for each interlace of interest, instead of a full N-point FFT. The M interlaces may be used to transmit the multiple data streams in an FDM manner. In an embodiment, each interlace is used by only one data stream in each symbol period, and up to M data streams may be sent on the M interlaces in each symbol period.

In an embodiment, the multiple data streams are allocated "slots", where each slot is a unit of transmission that may be equal to one interlace in one symbol period. M slots are then available in each symbol period and may be assigned slot indices 1 through M. Each slot index may be mapped to one interlace in each symbol period based on a slot-to-interlace mapping scheme. One or more slot indices may be used for an FDM pilot, and the remaining slot indices may be used for data transmission. The slot-to-interlace mapping may be such that the interlaces used for pilot transmission have varying distances to the interlaces used for each slot index in different OFDM symbol periods. This allows all slot indices used for data transmission to achieve similar channel estimation performance.

Each data stream may be processed as data packets of a fixed size. In this case, different numbers of slots may be used for each data packet depending on the coding and modulation scheme used for the data packet. Alternatively, each data stream may be processed as data packets of variable sizes. For example, the packet sizes may be selected such that an integer number of data packets is sent in each slot. In any case, if multiple data packets are sent in a given slot, then the data symbols for each data packet may be distributed across all subbands used for the slot, so that frequency diversity is achieved for each data packet sent in the slot.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 8A and 8B show partitioning of different numbers of packets into slots;

FIG. 9A shows a block diagram of a transmit (TX) data processor;

FIG. 9B shows a block diagram of a modulator;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The multiplexing techniques described herein may be used for various wireless multi-carrier communication systems. These techniques may also be used for the downlink as well as the uplink. The downlink (or forward link) refers to the communication link from the base stations to the wireless devices, and the uplink (or reverse link) refers to the communication link from the wireless devices to the base stations. For clarity, these techniques are described below for the downlink in an OFDM-based system.

Figure 1:
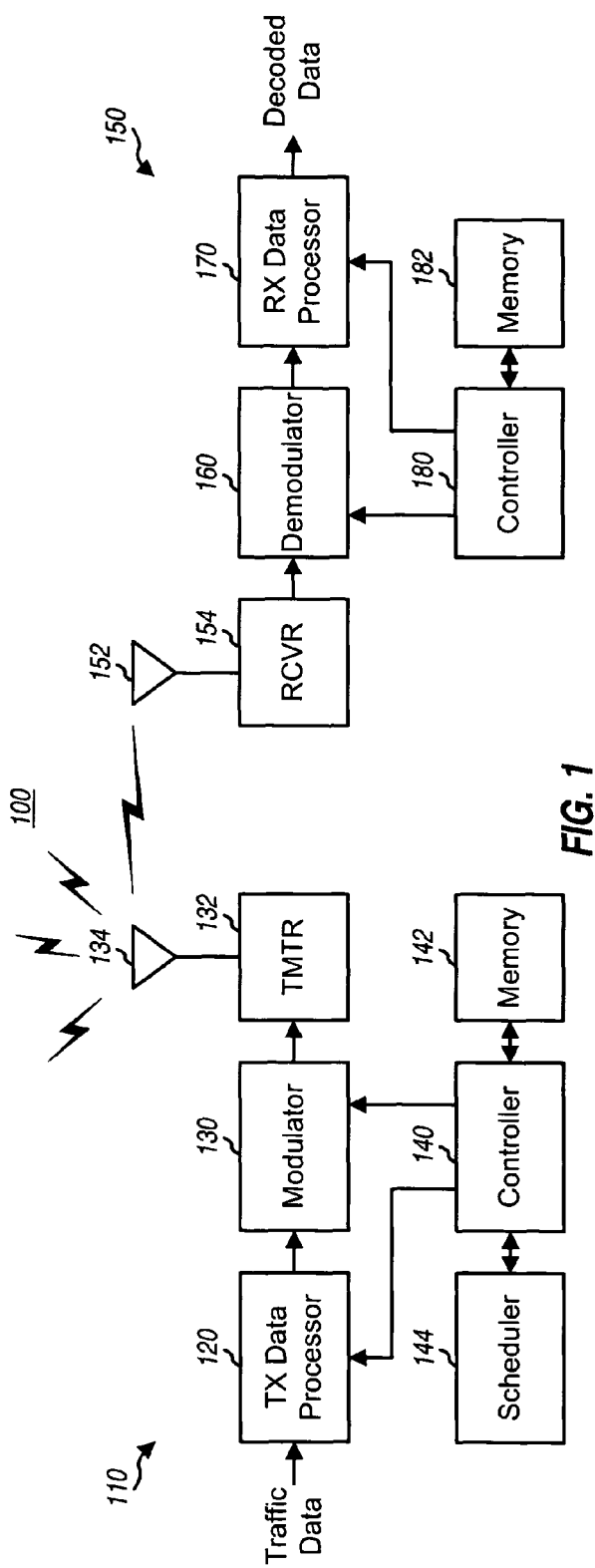
FIG. 1 shows a block diagram of a base station and a wireless device.

FIG. 1 shows a block diagram of a base station 110 and a wireless device 150 in a wireless system 100 that utilizes OFDM. Base station 110 is generally a fixed station and may also be referred to as a base transceiver system (BTS), an access point, a transmitter, or some other terminology. Wireless device 150 may be fixed or mobile and may also be referred to as a user terminal, a mobile station, a receiver, or some other terminology. Wireless device 150 may also be a portable unit such as a cellular phone, a handheld device, a wireless module, a personal digital assistant (PDA), and so on.

At base station 110, a TX data processor 120 receives multiple (T) data streams (or "traffic" data) and processes (e.g., encodes, interleaves, and symbol maps) each data stream to generate data symbols. As used herein, a "data symbol" is a modulation symbol for traffic data, a "pilot symbol" is a modulation symbol for pilot (which is data that is known a priori by both the base station and wireless devices), and a modulation symbol is a complex value for a point in a signal constellation for a modulation scheme (e.g., M-PSK, M-QAM, and so on). TX data processor 120 also multiplexes the data symbols for the T data streams and pilot symbols onto the proper subbands and provides a composite symbol stream. A modulator 130 performs OFDM modulation on the multiplexed symbols in the composite symbol stream to generate OFDM symbols. A transmitter unit (TMTR) 132 converts the OFDM symbols into analog signals and further conditions (e.g., amplifies, filters, and frequency upconverts) the analog signals to generate a modulated signal. Base station 110 then transmits the modulated signal from an antenna 134 to wireless devices in the system.

At wireless device 150, the transmitted signal from base station 110 is received by an antenna 152 and provided to a receiver unit (RCVR) 154. Receiver unit 154 conditions (e.g., filters, amplifies, and frequency downconverts) the received signal and digitizes the conditioned signal to generate a stream of input samples. A demodulator 160 performs OFDM demodulation on the input samples to obtain received symbols for one or more data streams of interest, and further performs detection (e.g., equalization or matched filtering) on the received symbols to obtain detected data symbols, which are estimates of the data symbols sent by base station 110. An RX data processor 170 then processes (e.g., symbol demaps, deinterleaves, and decodes) the detected data symbols for each selected data stream and provides decoded data for that stream. The processing by demodulator 160 and RX data processor 170 is complementary to the processing by modulator 130 and TX data processor 120, respectively, at base station 110.

Controllers 140 and 180 direct operation at base station 110 and wireless device 150, respectively. Memory units 142 and 182 provide storage for program codes and data used by controllers 140 and 180, respectively. Controller 140 or a scheduler 144 may allocate system resources for the T data streams.

Base station 110 may transmit the T data streams for various services such as broadcast, multicast, and/or unicast services. A broadcast transmission is sent to all wireless devices within a designated coverage area, a multicast transmission is sent to a group of wireless devices, and a unicast transmission is sent to a specific wireless device. For example, base station 110 may broadcast a number of data streams for multimedia (e.g., television) programs and for multimedia content such as video, audio, teletext, data, video/audio clips, and so on. A single multimedia program may be broadcast as three separate data streams for video, audio, and data. This allows for independent reception of the video, audio, and data portions of the multimedia program by a wireless device.

Figure 2:
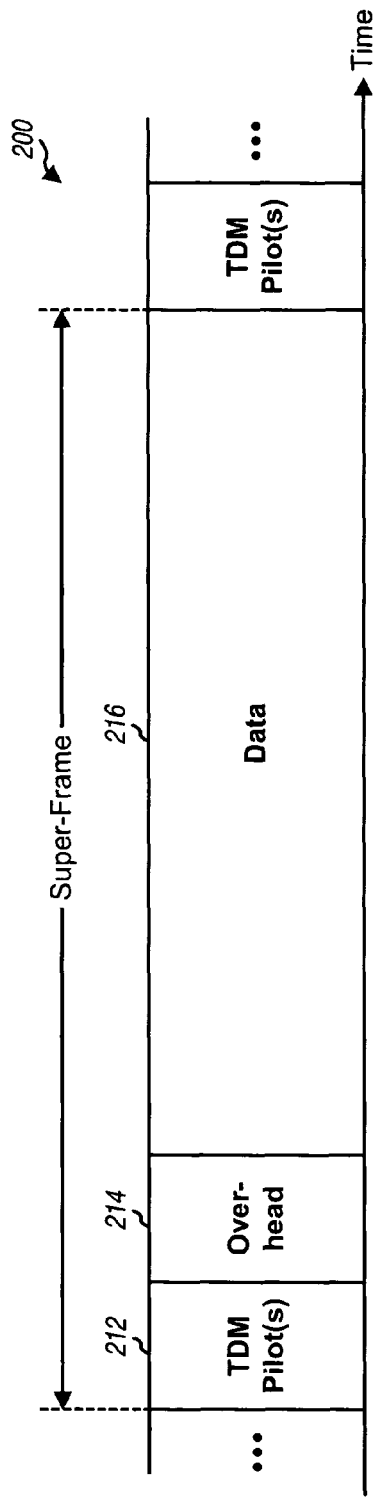
FIG. 2 shows an exemplary super-frame structure.

FIG. 2 shows an exemplary super-frame structure 200 that may be used for system 100. The T data streams may be transmitted in super-frames, with each super-frame having a predetermined time duration. A super-frame may also be referred to as a frame, a time slot, or some other terminology. For the embodiment shown in FIG. 2, each super-frame includes a field 212 for one or more TDM pilots, a field 214 for overhead/control data, and a field 216 for traffic data. The TDM pilot(s) may be used by a wireless device for synchronization (e.g., frame detection, frequency error estimation, timing acquisition, and so on). The overhead/control data may indicate various parameters for the T data streams (e.g., the coding and modulation scheme used for each data stream, the specific location of each data stream within the super-frame, and so on). The T data streams are sent in field 216. Although not shown in FIG. 2, each super-frame may be divided into multiple (e.g., four) equal-sized frames to facilitate data transmission. Other frame structures may also be used for system 100.

Figure 3:
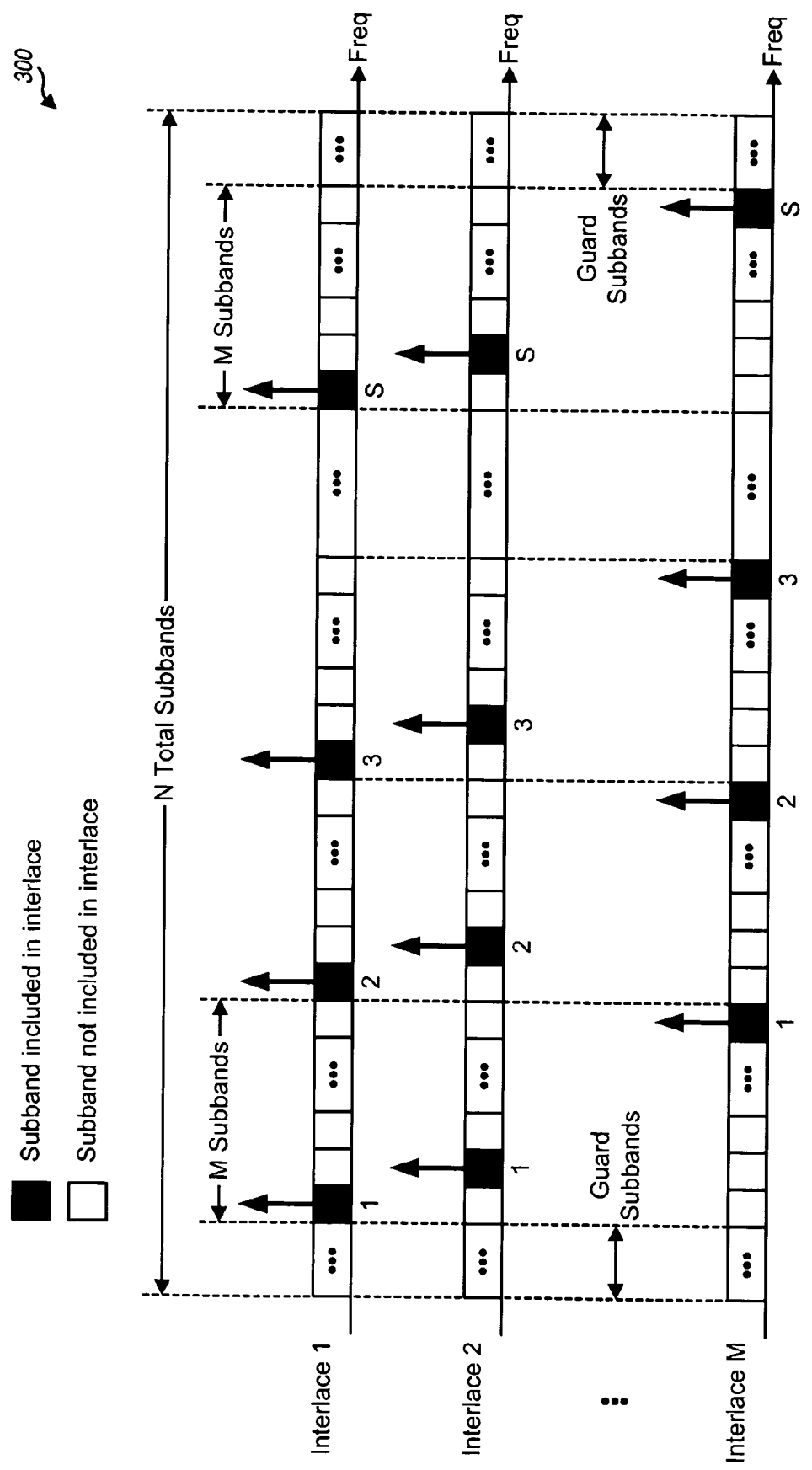
FIG. 3 shows an interlaced subband structure.

FIG. 3 shows an interlaced subband structure 300 that may be used for system 100. System 100 utilizes an OFDM structure having N total subbands. U subbands may be used for data and pilot transmission and are called "usable" subbands, where $U \leq N$. The remaining G subbands are not used and are called "guard" subbands, where $N=U+G$. As an example, system 100 may utilize an OFDM structure with $N=4096$ total subbands, $U=4000$ usable subbands, and $G=96$ guard subbands.

The U usable subbands may be arranged into M interlaces or disjoint subband sets. The M interlaces are disjoint or non-overlapping in that each of the U usable subbands belongs to only one interlace. Each interlace contains S usable subbands, where $U=M \cdot S$. Each interlace may be associated with a different group of $S'=N/M$ subbands that are uniformly distributed across the N total subbands such that consecutive subbands in the group are spaced apart by M subbands. For example, group 1 may contain subbands 1, M+1, 2M+1, and so on, group 2 may contain subbands 2, M+2, 2M+2, and so on, and group M may contain subbands M, 2M, 3M, and so on. For each group, S of the S' subbands are usable subbands and the remaining S'-S subbands are guard subbands. Each interlace may then contain the S usable subbands in the group associated with the interlace. For the exemplary OFDM structure described above, M=8 interlaces may be formed, with each interlace containing S=500 usable subbands selected from among S'=512 subbands that are evenly spaced apart by M=8 subbands. The S usable subbands in each interlace are thus interlaced with the S usable subbands in each of the other M-1 interlaces.

In general, the system may utilize any OFDM structure with any number of total, usable, and guard subbands. Any number of interlaces may also be formed. Each interlace may contain any number of usable subbands and any one of the U usable subbands. The interlaces may also contain the same or different numbers of usable subbands. For simplicity, the following description is for the interlaced subband structure shown in FIG. 3 with M interlaces and each interlace containing S uniformly distributed usable subbands. This interlaced subband structure provides several advantages. First, frequency diversity is achieved since each interlace contains usable subbands taken from across the entire system bandwidth. Second, a wireless device may recover data/pilot symbols sent on a given interlace by performing a partial S'-point FFT instead of a full N-point FFT, which can simplify the processing by the wireless device.

Base station 110 may transmit an FDM pilot on one or more interlaces to allow the wireless devices to perform various functions such as, for example, channel estimation, frequency tracking, time tracking, and so on. Base station 110 may transmit the FDM pilot and traffic data in various manners.

Figure 4A:
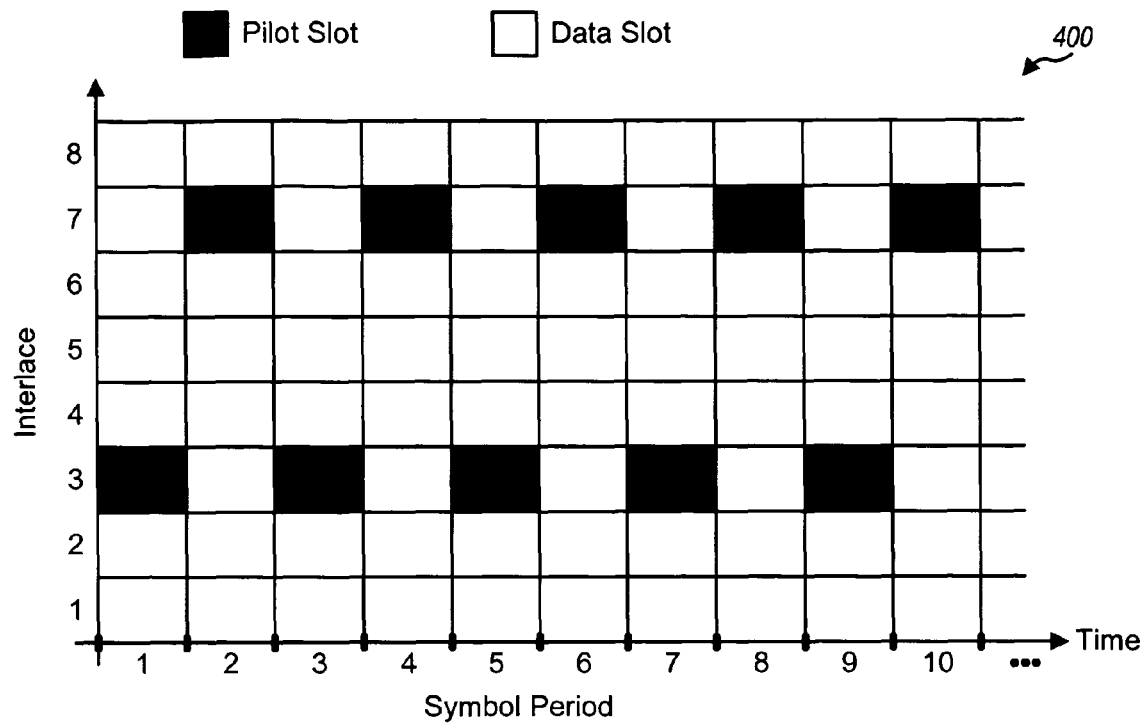
FIGS. 4A and 4B show "staggered" and "cycled" FDM pilots, respectively.

FIG. 4A shows a data and pilot transmission scheme 400 with a "staggered" FDM pilot. In this example, M=8, one interlace is used for the FDM pilot in each symbol period, and the remaining seven interlaces are used for traffic data. The FDM pilot is sent on two designated interlaces in an alternating manner such that pilot symbols are sent on one interlace (e.g., interlace 3) in odd-numbered symbol periods and on another interlace (e.g., interlace 7) in even-numbered symbol periods. The two interlaces used for the FDM pilot are staggered or offset by M/2=4 interlaces. This staggering allows the wireless devices to observe the channel response for more subbands, which may improve performance.

Figure 4B:
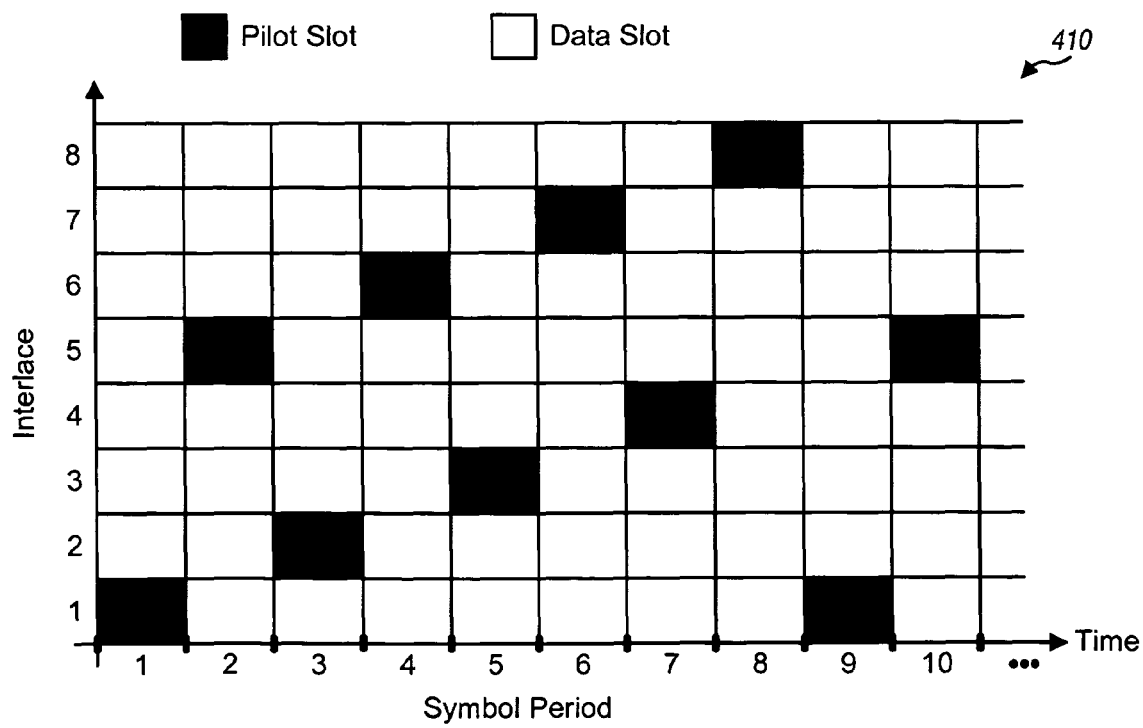

FIG. 4B shows a data and pilot transmission scheme 410 with a "cycled" FDM pilot. In this example, M=8, one interlace is used for the FDM pilot in each symbol period, and the remaining seven interlaces are used for traffic data. The FDM pilot is sent on all eight interlaces in a cycled manner such that pilot symbols are sent on a different interlace in each M-symbol period duration. For example, the FDM pilot may be sent on interlace 1 in symbol period 1, then interlace 5 in symbol period 2, then interlace 2 in symbol period 3, and so on, then interlace 8 in symbol period 8, then back to interlace 1 in symbol period 9, and so on. This cycling allows the wireless devices to observe the channel response for all usable subbands.

In general, an FDM pilot may be sent on any number of interlaces and on any one of the M interlaces in each symbol period. The FDM pilot may also be sent using any pattern, two of which are shown in FIGS. 4A and 4B.

Base station 110 may transmit the T data streams on the M interlaces in various manners. In a first embodiment, each data stream is sent on the same one or more interlaces in each symbol period in which the data stream is sent. For this embodiment, the interlaces are statically assigned to each data stream. In a second embodiment, each data stream may be sent on different interlaces in different symbol periods in which the data stream is sent. For this embodiment, the interlaces are dynamically assigned to each data stream, which may improve frequency diversity and also ensure that the quality of the channel estimate is independent of the slot index or indices assigned to the data stream. The second embodiment may be viewed as a form of frequency hopping and is described in further detail below.

To average out channel estimation and detection performance for all T data streams, transmission scheme 410 may be used for the first embodiment with statically assigned interlaces, and either transmission scheme 400 or 410 may be used for the second embodiment with dynamically assigned interlaces. If the FDM pilot is sent on the same one interlace (which is called the pilot interlace) in each symbol period and is used to obtain channel estimates for all M interlaces, then the channel estimate for an interlace that is closer to the pilot interlace is typically better than the channel estimate for an interlace that is further away from the pilot interlace. Detection performance for a data stream may be degraded if the stream is consistently allocated interlaces that are far away from the pilot interlace. The allocation of interlaces with varying distances (or spacing or offset) to the pilot interlace can avoid this performance degradation due to channel estimation bias.

For the second embodiment, M slots may be defined for each symbol period, and each slot may be mapped to one interlace in one symbol period. A slot usable for traffic data is also called a data slot, and a slot usable for the FDM pilot is also called a pilot slot. The M slots in each symbol period may be given indices 1 through M. Slot index 1 may be used for the FDM pilot, and slot indices 2 through M may be used for data transmission. The T data streams may be allocated slots with indices 2 through M in each symbol period. The use of slots with fixed indices can simplify the allocation of slots to data streams. The M slot indices may be mapped to the M interlaces in each symbol period based on any mapping scheme that can achieve the desired frequency diversity and channel estimation performance.

In a first slot-to-interlace mapping scheme, the slot indices are mapped to interlaces in a permutated manner. For transmission scheme 400 with M=8 and one pilot slot and seven data slots in each symbol period, the mapping may be performed as follows. The eight interlaces may be denoted by an original sequence $\{I_1, I_2, I_3, I_4, I_5, I_6, I_7, I_8\}$. A permutated sequence may be formed as $\{I_1, I_5, I_3, I_7, I_2, I_6, I_4, I_8\}$. The i-th interlace in the original sequence is placed in the $i_{br}$-th position in the permutated sequence, where $i \in \{1 \ldots 8\}$, $i_{br} \in \{1 \ldots 8\}$, and $(i_{br}-1)$ is a bit-reverse index of $(i-1)$. An offset of -1 is used for i and $i_{br}$ because these indices start from 1 instead of 0. As an example, for i=7, (i-1)=6, the bit representation is '110', the bit-reverse index is '011', $(i_{br}-1)=3$, and $i_{br}=4$. The 7-th interlace in the original sequence is thus placed in the 4-th position in the permutated sequence. The two interlaces used for the FDM pilot are then combined in the permutated sequence to form a shortened interlace sequence $\{I_1, I_5, I_{3/7}, I_2, I_6, I_4, I_8\}$. The k-th slot index used for data transmission (or the k-th data slot index), for $k \in \{2 \ldots 8\}$, is then mapped to the (k-1)-th interlace in the shortened interlace sequence. For each symbol period thereafter, the shortened interlace sequence is circularly shifted to the right by two positions and wraps around to the left. The k-th data slot index is again mapped to the (k−1)-th interlace in the circularly shifted shortened interlace sequence.

Figure 5:
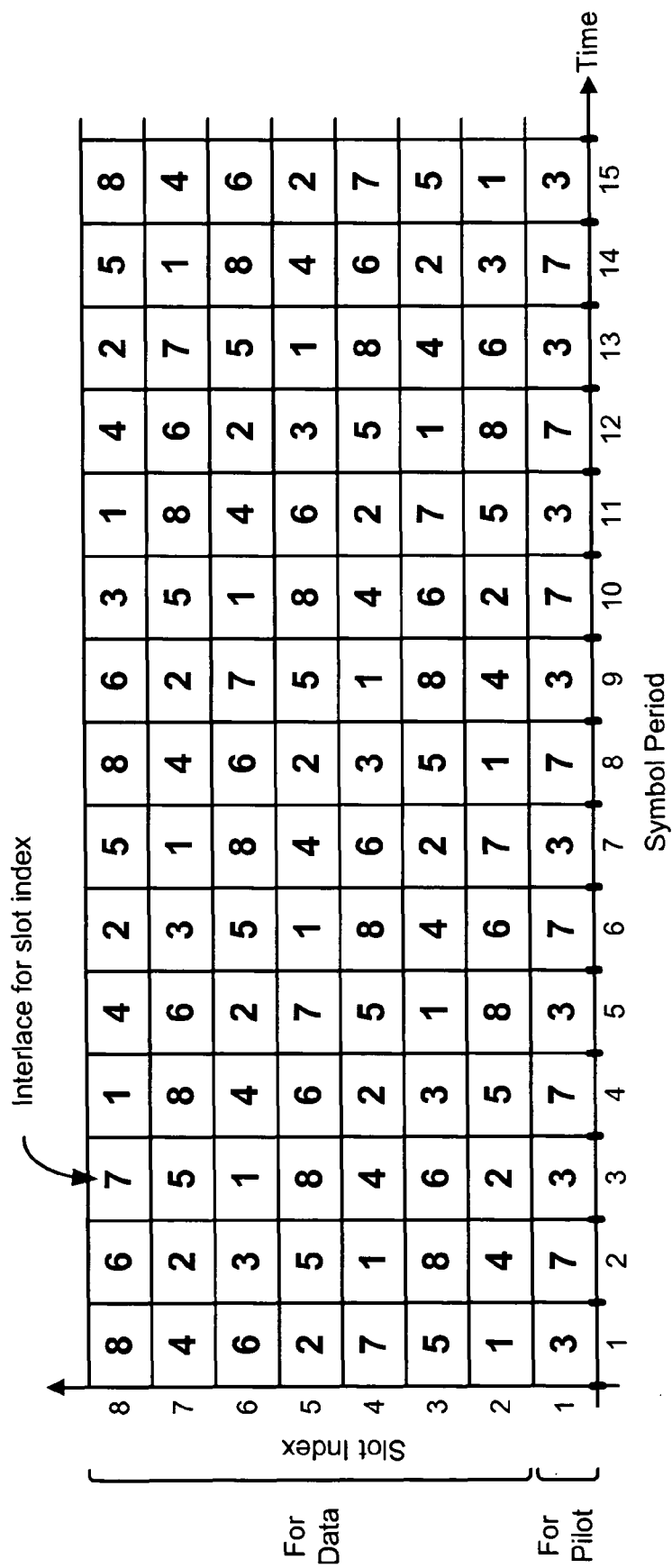
FIG. 5 shows an exemplary mapping of slot indices to interlaces.

FIG. 5 shows the mapping of slot indices to interlaces for the first mapping scheme described above. Slot index 1, which is used for the FDM pilot, is mapped to interlaces 3 and 7 on alternating symbol periods for transmission scheme 400. Data slot indices 2 through 8 are mapped to the seven interlaces in the shortened interlace sequence $\{I_1, I_5, I_{3/7}, I_2, I_6, I_4, I_8\}$ for the first symbol period, to the circularly or cyclically shifted shortened interlace sequence $\{I_4, I_8, I_1, I_5, I_{3/7}, I_2, I_6\}$ for the second symbol period, and so on. As shown in FIG. 5, each data slot index is mapped to seven different interlaces in seven consecutive symbol periods, where one of the seven interlaces is either interlace 3 or 7. All seven data slot indices should then achieve similar performance.

In a second slot-to-interlace mapping scheme, the slot indices are mapped to interlaces in a pseudo-random manner. A pseudo-random number (PN) generator may be used to generate PN numbers that are used to map slot indices to interlaces. The PN generator may be implemented with a linear feedback shift register (LFSR) that implements a particular generator polynomial, e.g., $g(x)=x^{15}+x^{14}+1$. For each symbol period j, the LFSR is updated and the V least significant bits (LSBs) in the LFSR may be denoted as PN (j), where j=1, 2, … and $V=\log_2 M$. The k-th data slot index, for $k \in \{2 \ldots M\}$, may be mapped to interlace $[(PN(j)+k) \bmod M]+1$, if this interlace is not used for the FDM pilot, and to interlace $[(PN(j)+k+1) \bmod M]+1$, otherwise.

In a third slot-to-interlace mapping scheme, the slot indices are mapped to interlaces in a circular manner. For each symbol period j, the k-th data slot index, for $k \in \{2 \ldots M\}$, may be mapped to interlace $[(j+k) \bmod M]+1$, if this interlace is not used for the FDM pilot, and to interlace $[(j+k+1) \bmod M]+1$, otherwise.

The M slot indices may thus be mapped to the M interlaces in various manners. Some exemplary slot-to-interlace mapping schemes have been described above. Other mapping schemes may also be used, and this is within the scope of the invention.

The slots may be allocated to the T data streams in various manners. In a first slot allocation scheme, each data stream is allocated a sufficient number of slots in each super-frame to transmit a non-negative integer number of data packets (i.e., zero or more data packets). For this scheme, the data packets may be defined to have a fixed size (i.e., a predetermined number of information bits), which can simplify the coding and decoding for the data packets. Each fixed-size data packet may be coded and modulated to generate a coded packet having a variable size that is dependent on the coding and modulation scheme used for the packet. The number of slots needed to transmit the coded packet is then dependent on the coding and modulation scheme used for the packet.

In a second slot allocation scheme, each data stream may be allocated a non-negative integer number of slots in each super-frame, and an integer number of data packets may be sent in each allocated slot. The same coding and modulation scheme may be used for all data packets sent in any given slot. Each data packet may have a size that is dependent on (1) the number of data packets being sent in the slot and (2) the coding and modulation scheme used for that slot. For this scheme, the data packets may have variable sizes.

The slots may also be allocated to the data streams in other manners. For clarity, the following description assumes that the first slot allocation scheme is used by the system.

Each data stream may be coded in various manners. In an embodiment, each data stream is coded with a concatenated code comprised of an outer code and an inner code. The outer code may be a block code such as a Reed-Solomon (RS) code or some other code. The inner code may be a Turbo code, a convolutional code, or some other code.

Figure 6:
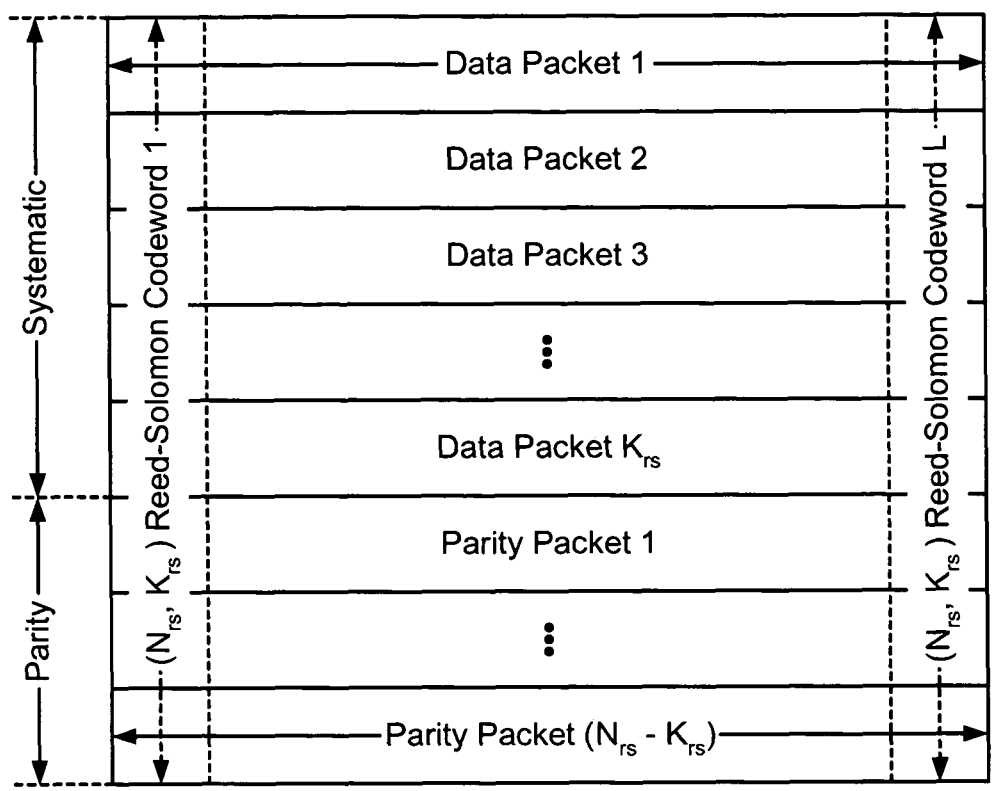
FIG. 6 illustrates coding of a data block with an outer code.

FIG. 6 shows an exemplary outer coding scheme using a Reed-Solomon outer code. A data stream is partitioned into data packets. In an embodiment, each data packet has a fixed size and contains a predetermined number of information bits or L information bytes (e.g., 1000 bits or 125 bytes). The data packets for the data stream are written into rows of a memory, one packet per row. After $K_{rs}$ data packets have been written into $K_{rs}$ rows, block coding is performed column-wise, one column at a time. In an embodiment, each column contains $K_{rs}$ bytes (one byte per row) and is coded with an ($N_{rs}$, $K_{rs}$) Reed-Solomon code to generate a corresponding codeword that contains $N_{rs}$ bytes. The first $K_{rs}$ bytes of the codeword are data bytes (which are also called systematic bytes) and the last $N_{rs}-K_{rs}$ bytes are parity bytes (which may be used by a wireless device for error correction). The Reed-Solomon coding generates $N_{rs}-K_{rs}$ parity bytes for each codeword, which are written to rows $N_{rs}-K_{rs}$ through $N_{rs}$ of the memory after the $K_{rs}$ rows of data. An RS block contains $K_{rs}$ rows of data and $N_{rs}-K_{rs}$ rows of parity. In an embodiment, $N_{rs}=16$ and $K_{rs}$ is a configurable parameter, e.g., $K_{rs} \in \{12, 14, 16\}$. The Reed-Solomon code is disabled when $K_{rs}=N_{rs}$. Each data/parity packet (or each row) of the RS block is then coded by the Turbo inner code to generate a corresponding coded packet. A code block contains $N_{rs}$ coded packets for the $N_{rs}$ rows of the RS block.

The $N_{rs}$ coded packets for each code block may be sent in various manners. For example, each code block may be transmitted in one super-frame. Each super-frame may be partitioned into multiple (e.g., four) frames. Each code block may then be partitioned into multiple (e.g., four) sub-blocks, and each sub-block of the code block may be sent in one frame of the super-frame. The transmission of each code block in multiple parts across a super-frame can provide time diversity.

Each data stream may be transmitted with or without hierarchical coding, where the term "coding" in this context refers to channel coding rather than data coding at a transmitter. A data stream may be comprised of two substreams, which are called a base stream and an enhancement stream. The base stream may carry base information and may be sent to all wireless devices within the coverage area of the base station. The enhancement stream may carry additional information and may be sent to wireless devices observing better channel conditions. With hierarchical coding, the base stream is coded and modulated to generate a first modulation symbol stream, and the enhancement stream is coded and modulated to generate a second modulation symbol stream. The same or different coding and modulation schemes may be used for the base stream and enhancement stream. The two modulation symbol streams may then be scaled and combined to obtain one data symbol stream.

Table 1 shows an exemplary set of eight "modes" that may be supported by system 100. These eight modes are given indices of 1 through 8. Each mode is associated with a specific modulation scheme (e.g., QPSK or 16-QAM) and a specific inner code rate (e.g., 1/3, 1/2, or 2/3). The first five modes are for "regular" coding with only the base stream, and the last three modes are for hierarchical coding with the base and enhancement streams. For simplicity, the same modulation scheme and inner code rate are used for both the base and enhancement streams for each hierarchical coding mode.

TABLE 1

| Mode | Modulation Scheme | Inner Code Rate | Number Slots/Packet |
|---|---|---|---|
| 1 | QPSK | 1/3 | 3 |
| 2 | QPSK | 1/2 | 2 |
| 3 | 16-QAM | 1/3 | 1.5 |
| 4 | 16-QAM | 1/2 | 1 |
| 5 | 16-QAM | 2/3 | 0.75 |
| 6 | QPSK/QPSK | 1/3 | 3 |
| 7 | QPSK/QPSK | 1/2 | 2 |
| 8 | QPSK/QPSK | 2/3 | 1.5 |

The fourth column of Table 1 indicates the number of slots needed to transmit one fixed-size data packet for each mode. Table 1 assumes a data packet size of $2 \cdot S$ information bits and S usable subbands per slot (e.g., S=500). Each slot has a capacity of S data symbols since the slot is mapped to one interlace with S usable subbands and each subband can carry one data symbol. For mode 1, a data packet with $2 \cdot S$ information bits is coded with a rate 1/3 inner code to generate $6 \cdot S$ code bits, which are then mapped to $3 \cdot S$ data symbols using QPSK. The $3 \cdot S$ data symbols for the data packet may be sent in three slots, with each slot carrying S data symbols. Similar processing may be performed for each of the other modes in Table 1.

Table 1 shows an exemplary design. Data packets of other sizes (e.g., 500 information bits, 2000 information bits, and so on) may also be used. Multiple packet sizes may also be used, for example, so that each packet may be sent in an integer number of slots. For example, a packet size of 1000 information bits may be used for modes 1, 2 and 4, and a packet size of 1333 information bits may be used for modes 3 and 5. In general, the system may also support any number of modes for any number of coding and modulation schemes, any number of data packet sizes, and any packet size.

Figure 7A:
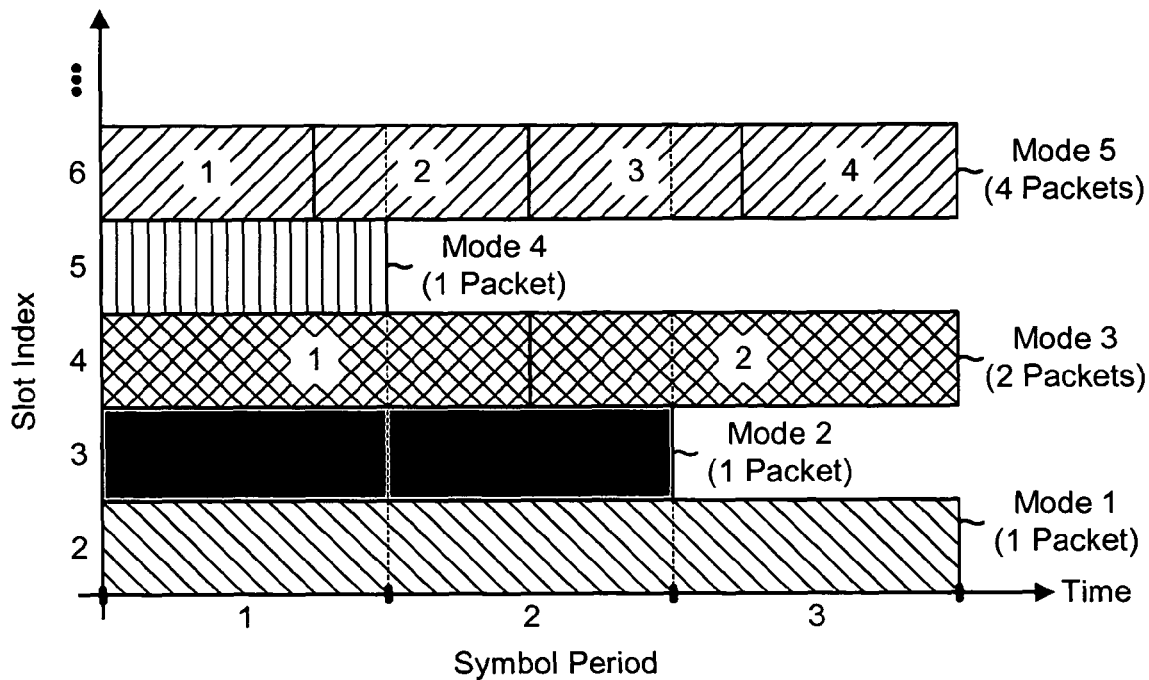
FIGS. 7A and 7B show transmission of packets for different modes.

FIG. 7A shows transmission of a minimum integer number of data packets, using one slot in each of an integer number of symbol periods, for each of the first five modes listed in Table 1. One data packet may be sent using one slot in (1) three symbol periods for mode 1, (2) two symbol periods for mode 2, and (3) one symbol period for mode 4. Two data packets may be sent using one slot in three symbol periods for mode 3, since each data packet takes 1.5 slots to send. Four data packets may be sent using one slot in three symbol periods for mode 5, since each data packet takes 0.75 slots to send.

Figure 7B:
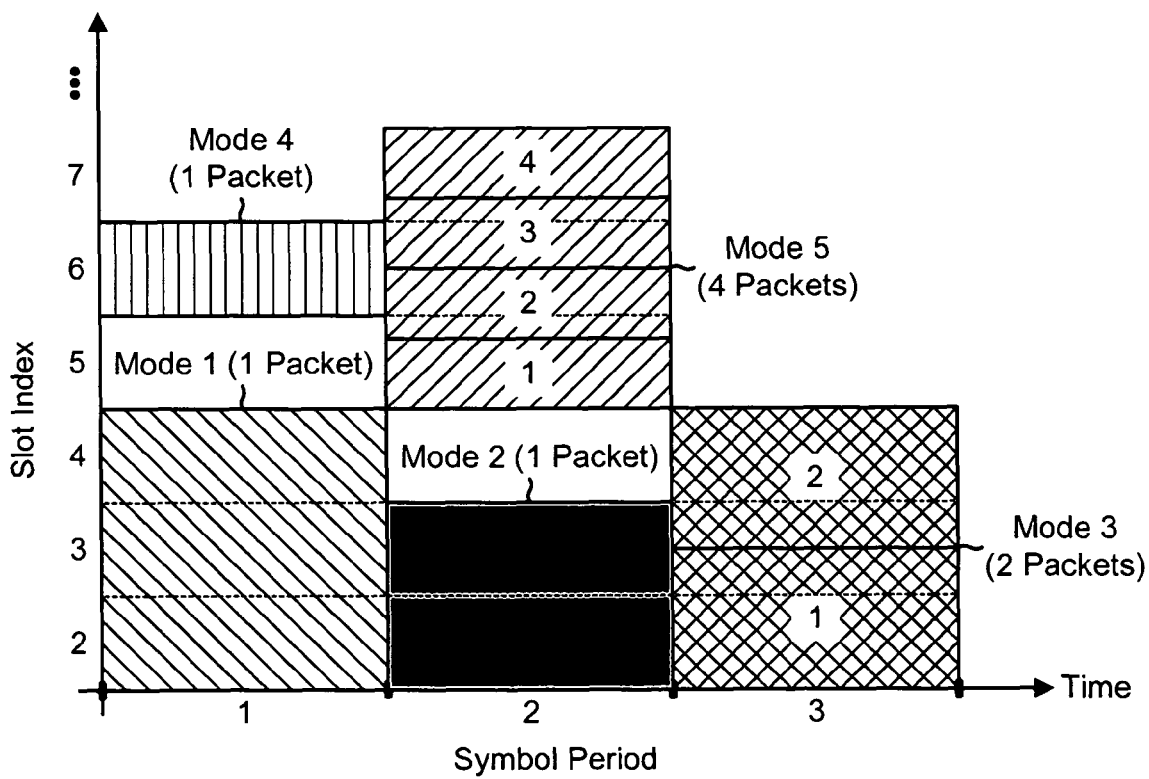

FIG. 7B shows transmission of a minimum integer number of data packets, using an integer number of slots in one symbol period, for each of the first five modes listed in Table 1. One data packet may be sent in one symbol period using (1) three slots for mode 1, (2) two slots for mode 2, and (3) one slot for mode 4. Two data packets may be sent in one symbol period using three slots for mode 3. Four data packets may be sent in one symbol period using three slots for mode 5.

As shown in FIGS. 7A and 7B, the minimum number of data packets may be transmitted in several manners for each mode (except for mode 4). Transmitting the minimum number of data packets in a shorter time period reduces the amount of ON time required to receive the data packets but provides less time diversity. The converse is true for transmitting the minimum number of data packets over a longer time period.

FIG. 8A shows the partitioning of a single coded packet into three slots for mode 1. The three slots may be for three different interlaces in one symbol period or one interlace in three different symbol periods. The three slots may observe different channel conditions. The bits in the coded packet may be interleaved (i.e., reordered) prior to the partitioning into three slots. The interleaving for each coded packet can randomize the signal-to-noise ratios (SNRs) of the bits across the coded packet, which may improve decoding performance. The interleaving may be performed in various manners, as is known in the art. The interleaving may also be such that adjacent bits in the coded packet are not sent in the same data symbol.

FIG. 8B shows the partitioning of four coded packets into three slots for mode 5. The three slots may be sequentially filled by the four coded packets, as shown in FIG. 8B. When multiple coded packets share a slot (such as for modes 3 and 5), all of the bits to be sent in the slot may be interleaved such that the bits for each coded packet sent in the slot are distributed across the subbands used for the slot. The interleaving across each slot provides frequency diversity for each coded packet sent in the slot and may improve decoding performance.

The interleaving across a slot may be performed in various manners. In an embodiment, the bits for all coded packets to be sent in a given slot are first mapped to data symbols, and the data symbols are then mapped to the subbands used for the slot in a permutated manner. For the symbol-to-subband mapping, a first sequence with S' sequential values, 0 through S'−1, is initially formed. A second sequence of S' values is then created such that the i-th value in the second sequence is equal to the bit reverse of the i-th value in the first sequence. All values that are equal to or greater than S' in the second sequence are removed to obtain a third sequence with S values ranging from 0 through S−1. Each value in the third sequence is then incremented by one to obtain a sequence of S permutated index values ranging from 1 through S, which is denoted as F (j). The j-th data symbol in the slot may be mapped to the F (j)-th subband in the interlace used for the slot. For example, if S=500 and S'=512, then the first sequence is {0, 1, 2, 3, ..., 510, 511}, the second sequence is {0, 256, 128, 384, ..., 255, 511}, and the third sequence is {0, 256, 128, 384, ... 255}. The sequence F (j) only needs to be computed once and may be used for all slots. Other mapping schemes may also be used for the symbol-to-subband mapping to achieve interleaving across each slot.

In general, each data stream may carry any number of data packets in each super-frame, depending on the data rate of the stream. Each data stream is allocated a sufficient number of slots in each super-frame based on its data rate, subject to the availability of slots and possibly other factors. For example, each data stream may be constrained to a specified maximum number of slots in each symbol period, which may be dependent on the mode used for the data stream. Each data stream may be limited to a specified maximum data rate, which is the maximum number of information bits that may be transmitted in each symbol period for the data stream. The maximum data rate is typically set by the decoding and buffering capabilities of the wireless devices. Constraining each data stream to be within the maximum data rate ensures that the data stream can be recovered by wireless devices having the prescribed decoding and buffering capabilities. The maximum data rate limits the number of data packets that may be transmitted in each symbol period for the data stream. The maximum number of slots may then be determined by the maximum number of data packets and the mode used for the data stream.

In an embodiment, each data stream may be allocated an integer number of slots in any given symbol period, and multiple data streams do not share an interlace. For this embodiment, up to M−1 data streams may be sent on the M−1 data slots in each symbol period, assuming that one slot is used for the FDM pilot. In another embodiment, multiple data streams may share an interlace.

FIG. 9A shows a block diagram of an embodiment of TX data processor 120 at base station 110. TX data processor 120 includes T TX data stream processors 910a through 910t for the T data streams, a TX overhead data processor 930 for overhead/control data, a pilot processor 932 for the TDM and FDM pilots, and a multiplexer (Mux) 940. Each TX data stream processor 910 processes a respective data stream $\{d_i\}$ to generate a corresponding data symbol stream $\{Y_i\}$, for $i \in \{1 \ldots T\}$.

Within each TX data stream processor 910, an encoder 912 receives and encodes data packets for its data stream $\{d_i\}$ and provides coded packets. Encoder 912 performs encoding in accordance with, for example, a concatenated code comprised of a Reed-Solomon outer code and a Turbo or convolutional inner code. In this case, encoder 912 encodes each block of $K_{rs}$ data packets to generate $N_{rs}$ coded packets, as shown in FIG. 6. The encoding increases the reliability of the transmission for the data stream. Encoder 912 may also generate and append a cyclic redundancy check (CRC) value to each coded packet, which may be used by a wireless device for error detection (i.e., to determine whether the packet is decoded correctly or in error). Encoder 912 may also shuffle the coded packets.

An interleaver 914 receives the coded packets from encoder 912 and interleaves the bits in each coded packet to generate an interleaved packet. The interleaving provides time and/or frequency diversity for the packet. A slot buffer 916 is then filled with interleaved packets for all the slots allocated to the data stream, e.g., as shown in FIG. 8A or 8B.

A scrambler 918 receives and scrambles the bits for each slot with a PN sequence to randomize the bits. M different PN sequences may be used for the M slot indices. The M PN sequences may be generated, for example, with a linear feedback shift register (LFSR) that implements a particular generator polynomial, e.g., $g(X)=x^{15}+x^{14}+1$. The LFSR may be loaded with a different 15-bit initial value for each slot index. Furthermore, the LFSR may be reloaded at the start of each symbol period. Scrambler 918 may perform an exclusive-OR on each bit in a slot with a bit in the PN sequence to generate a scrambled bit.

A bit-to-symbol mapping unit 920 receives the scrambled bits for each slot from scrambler 918, maps these bits to modulation symbols in accordance with a modulation scheme (e.g., QPSK or 16-QAM) selected for the data stream, and provides data symbols for the slot. The symbol mapping may be achieved by (1) grouping sets of B bits to form B-bit binary values, where $B \geq 1$, and (2) mapping each B-bit binary value to a complex value for a point in a signal constellation for the modulation scheme. The outer and inner codes for encoder 912 and the modulation scheme for mapping unit 920 are determined by the mode used for the data stream.

If the data stream is sent using hierarchical coding, then the base stream may be processed by one set of processing units 912 through 920 to generate a first stream of modulation symbols, and the enhancement stream may be processed by another set of processing units 912 through 920 to generate a second stream of modulation symbols (not shown in FIG. 9 for simplicity). The same coding and modulation scheme may be used for both the base stream and the enhancement stream, as shown in Table 1, or different coding and modulation schemes may be used for the two streams. A combiner may then receive and combine the first and second modulation symbol streams to generate the data symbols for the data stream. The hierarchical coding may also be performed in other manners. For example, the scrambled bits for both the base stream and enhancement stream may be provided to a single bit-to-symbol mapping unit that provides the data symbols for the data stream.

A slot-to-interlace mapping unit 922 maps each slot assigned to data stream $\{d_i\}$ to the proper interlace based on the slot-to-interlace mapping scheme used by the system (e.g., as shown in FIG. 5). A symbol-to-subband mapping unit 924 then maps the S data symbols in each slot to the proper subbands in the interlace to which the slot is mapped. The symbol-to-subband mapping may be performed in a manner to distribute the S data symbols across the S subbands used for the slot, as described above. Mapping unit 924 provides data symbols for data stream $\{d_i\}$, which are mapped to the proper subbands used for the data stream.

TX overhead data processor 930 processes overhead/control data in accordance with a coding and modulation scheme used for overhead/control data and provides overhead symbols. Pilot processor 932 performs processing for the TDM and FDM pilots and provides pilot symbols. Multiplexer 940 receives the mapped data symbols for the T data streams from TX data stream processors 910a through 910t, the overhead symbols from TX overhead data processor 930, the pilot symbols from pilot processor 932, and guard symbols. Multiplexer 940 provides the data symbols, overhead symbols, pilot symbols, and guard symbols onto the proper subbands and symbol periods based on a MUX_TX control from controller 140 and outputs a composite symbol stream, $\{Y_C\}$.

FIG. 9B shows a block diagram of an embodiment of modulator 130 at base station 110. Modulator 130 includes an inverse fast Fourier transform (IFFT) unit 950 and a cyclic prefix generator 952. For each symbol period, IFFT unit 950 transforms the N symbols for the N total subbands to the time domain with an N-point IFFT to obtain a "transformed" symbol that contains N time-domain samples. To combat intersymbol interference (ISI), which is caused by frequency selective fading, cyclic prefix generator 952 repeats a portion (or C samples) of each transformed symbol to form a corresponding OFDM symbol that contains N+C samples. The repeated portion is often called a cyclic prefix or guard interval. For example, the cyclic prefix length may be C=512 for N=4096. Each OFDM symbol is transmitted in one OFDM symbol period (or simply, symbol period), which is N+C sample periods. Cyclic prefix generator 952 provides an output sample stream $\{y\}$ for the composite symbol stream $\{Y_C\}$.

Figure 10A:
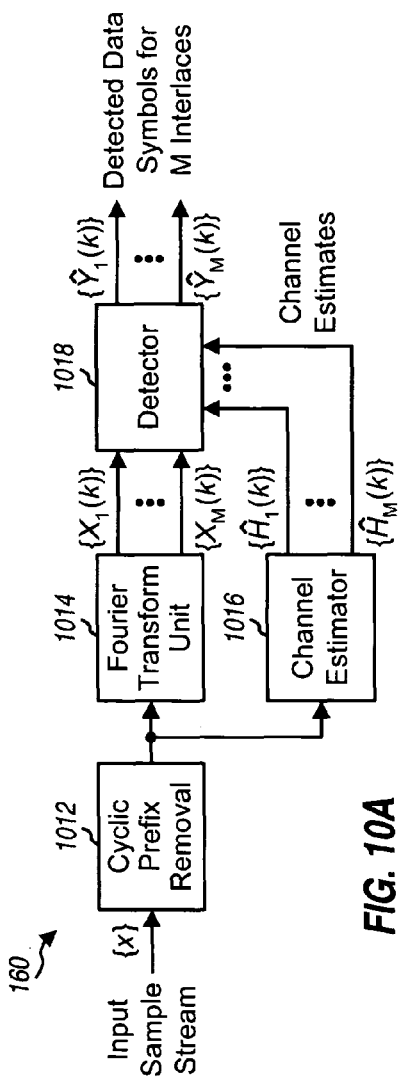
FIG. 10A shows a block diagram of a demodulator.

FIG. 10A shows a block diagram of an embodiment of demodulator 160 at wireless device 150. Demodulator 160 includes a cyclic prefix removal unit 1012, a Fourier transform unit 1014, a channel estimator 1016, and a detector 1018. Cyclic prefix removal unit 1012 removes the cyclic prefix in each received OFDM symbol and provides a sequence of N input samples, $\{x(n)\}$, for the received OFDM symbol. Fourier transform unit 1014 performs a partial Fourier transform on the input sample sequence $\{x(n)\}$ for each selected interlace m and provides a set of S received symbols, $\{X_m(k)\}$, for that interlace, where $m=1 \ldots M$. Channel estimator 1016 derives channel gain estimate $\{\hat{H}_m(k)\}$ for each selected interlace m based on the input sample sequence $\{x(n)\}$. Detector 1018 performs detection (e.g., equalization or matched filtering) on the set of S received symbols $\{X_m(k)\}$ for each selected interlace with the channel gain estimate $\{\hat{H}_m(k)\}$ for that interlace and provides S detected data symbols $\{\hat{Y}_m(k)\}$ for the interlace.

Figure 10B:
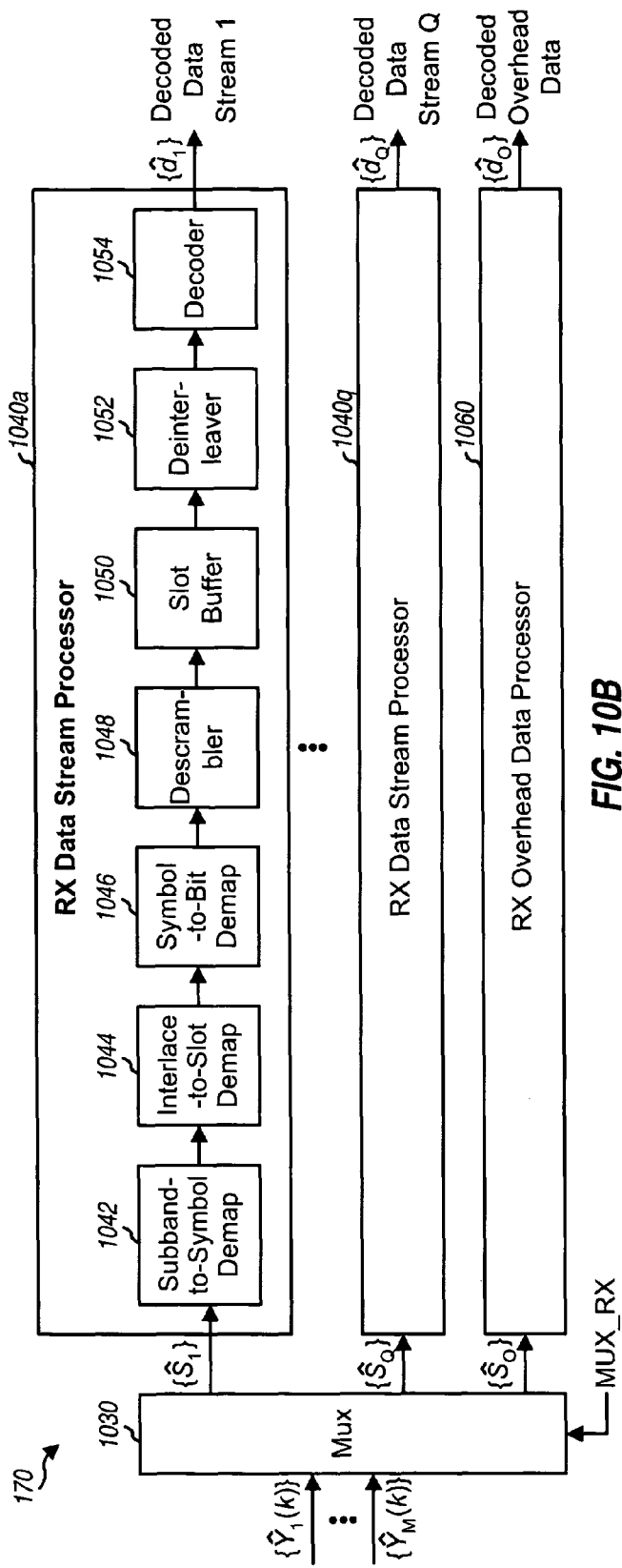
FIG. 10B shows a block diagram of a receive (RX) data processor.

FIG. 10B shows a block diagram of an embodiment of RX data processor 170 at wireless device 150. A multiplexer 1030 receives the detected data symbols for all interlaces from detector 1018, performs multiplexing of the detected data and overhead symbols for each symbol period based on the MUX_RX control, provides each detected data symbol stream of interest to a respective RX data stream processor 1040, and provides a detected overhead symbol stream to an RX overhead data processor 1060.

Within each RX data stream processor 1040, a subband-to-symbol demapping unit 1042 maps the received symbol on each subband in a selected interlace to the proper position within a slot. An interlace-to-slot demapping unit 1044 maps each selected interlace to the proper slot. A symbol-to-bit demapping unit 1046 maps the received symbols for each slot to code bits. A descrambler 1048 descrambles the code bits for each slot and provides descrambled data. A slot buffer 1050 buffers one or more slots of descrambled data, performs reassembly of packets as needed, and provides descrambled packets. A deinterleaver 1052 deinterleaves each descrambled packet and provides a deinterleaved packet. A decoder 1054 decodes the deinterleaved packets and provides decoded data packets for data stream $\{d_i\}$. In general, the processing performed by the units within RX data stream processor 1040 is complementary to the processing performed by the corresponding units within TX data stream processor 910 in FIG. 9A. The symbol-to-bit demapping and the decoding are performed in accordance with the mode used for the data stream. RX overhead data processor 1060 processes the received overhead symbols and provides decoded overhead data.

Because of the periodic structure of the M interlaces, Fourier transform unit 1014 may perform a partial S'-point Fourier transform for each selected interlace m to obtain the set of S received symbols $\{X_m(k)\}$ for that interlace. The Fourier transform for the S' subbands that include all S subbands of interlace m, where m=1 ... M, may be expressed as:

$$X(M \cdot k + m) = \sum_{n=1}^{N} x(n) \cdot W_N^{(M \cdot k + m)n}, \quad \text{for } k = 1 \ldots S', \quad \text{Eq (1)}$$

$$= \sum_{n=1}^{N} x(n) \cdot W_N^{mn} \cdot W_{S'}^{kn},$$

where x(n) is the input sample for sample period n, $$W_N^{\alpha\beta} = e^{-j\frac{2\pi(\alpha-1)(\beta-1)}{N}},$$

and N=M·S'. The following terms may be defined:

$$\tilde{x}_m(n) = x(n) \cdot W_N^{mn}, \quad \text{for } n = 1 \ldots N, \text{ and} \quad \text{Eq (2)}$$

$$g_m(n) = \sum_{i=0}^{M-1} \tilde{x}_m(S' \cdot i + n), \quad \text{for } n = 1 \ldots S', \quad \text{Eq (3)}$$

where $\tilde{x}_m(n)$ is a rotated sample obtained by rotating the input sample x(n) by $$W_N^{mn} = e^{-j\frac{2\pi(m-1)(n-1)}{N}},$$

which is a phasor that varies from sample to sample (the −1 in the exponent for the terms m−1 and n−1 is due to an index numbering scheme that starts with 1 instead of 0); and $g_m(n)$ is a time-domain value obtained by accumulating M rotated samples that are spaced apart by S' samples.

Equation (1) may then be expressed as:

$$X_m(k) = X(M \cdot k + m) = \sum_{n=1}^{S'} g_m(n) \cdot W_{S'}^{kn}, \quad \text{for } k = 1 \ldots S'. \quad \text{Eq (4)}$$

A partial S'-point Fourier transform for interlace m may be performed as follows. Each of the N input samples in the sequence $\{x(n)\}$ for one symbol period is first rotated by $W_N^{mn}$, as shown in equation (2), to obtain a sequence of N rotated samples $\{\tilde{x}_m(n)\}$. The rotated samples are then accumulated, in S' sets of M rotated samples, to obtain S' time-domain values $\{g_m(n)\}$, as shown in equation (3). Each set contains every S'-th rotated sample in the sequence $\{\tilde{x}_m(n)\}$, with the S' sets being associated with different starting rotated samples in the sequence $\{\tilde{x}_m(n)\}$. A normal S'-point Fourier transform is then performed on the S' time-domain values $\{g_m(n)\}$ to obtain the S' received symbols for interlace m. The received symbols for the S usable subbands are retained, and the received symbols for the S'−S unused subbands are discarded.

For channel estimation, a partial S'-point Fourier transform may be performed on the N input samples for interlace p used for the FDM pilot to obtain a set of S received pilot symbols, $\{X_p(k)\}$ or X(M·k+p). The modulation on the received pilot symbols is then removed to obtain channel gain estimates $\{\hat{H}_p(k)\}$ for the subbands in interlace p, as follows:

$$\hat{H}_p(k) = \hat{H}(M \cdot k + p) = X(M \cdot k + p) \cdot P^*(M \cdot k + p), \text{ for k=1 ... S'}, \quad \text{Eq (5)}$$

where P(M·k+p) is the known pilot symbol for the k-th subband in interlace p and "*" is a complex conjugate. Equation (5) assumes that all S' subbands are used for pilot transmission. An S'-point IFFT is then performed on the channel gain estimates $\{\hat{H}_p(k)\}$ to obtain a sequence of S' modulated time-domain channel gain values, $\{h_p(n)\}$, which may be expressed as: $h_p(n) = h(n) \cdot W_N^{pn}$, for n=1 ... S'. The channel gain values in the sequence $\{h_p(n)\}$ are then derotated by multiplication with $W_N^{-pn}$ to obtain a sequence of S' derotated time-domain channel gain values, $h(n) = h_p(n) \cdot W_N^{-pn}$, for n=1 ... S'.

The channel gain estimates for the subbands in interlace m may then be expressed as:

$$\hat{H}_m(k) = \hat{H}(M \cdot k + m), \quad \text{Eq (6)}$$

$$= \sum_{n=1}^{S'} h(n) \cdot W_N^{(M \cdot k + m)n}, \quad \text{for } k = 1 \ldots S'.$$

$$= \sum_{n=1}^{S'} h(n) \cdot W_N^{mn} \cdot W_{S'}^{kn},$$

As indicated in equation (6), the channel gain estimates for the subbands in interlace m may be obtained by first multiplying each derotated time-domain channel gain value in the sequence $\{h(n)\}$ by $W_N^{mn}$ to obtain a sequence of S' rotated channel gain values, $\{\tilde{h}_m(n)\}$. A normal S'-point FFT is then performed on the sequence $\{\tilde{h}_m(n)\}$ to obtain S' channel gain estimates for the subbands in interlace m. The derotation of $h_p(n)$ by $W^{-pn}$ and the rotation of h(n) by $W_N^{mn}$ may be combined, so that the rotated channel gain values for interlace m may be obtained as $h_m(n) = h_p(n) \cdot W_N^{(m-p)n}$, for n=1 ... S'.

An exemplary channel estimation scheme has been described above. The channel estimation may also be performed in other manners. For example, the channel estimates obtained for different interlaces used for pilot transmission may be filtered (e.g., over time) and/or post-processed (e.g., based on a least square estimate of the impulse response $\{h(n)\}$) to obtain a more accurate channel estimate for each interlace of interest.

The multiplexing techniques described herein may be implemented by various means. For example, these techniques may be implemented in hardware, software, or a combination thereof. For a hardware implementation, the processing units used to perform the multiplexing at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform the complementary processing at a wireless device may also be implemented within one or more ASICs, DSPs, and so on.

For a software implementation, the multiplexing techniques may be implemented with modules (e.g., procedures, functions, and so on) that perform the functions described herein. The software codes may be stored in a memory unit (e.g., memory unit 142 or 182 in FIG. 1) and executed by a processor (e.g., controller 140 or 180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data in a wireless multi-carrier communication system, comprising:
    allocating slots to each of a plurality of data symbol streams and pilot symbols, wherein each slot is a unit of transmission and a plurality of slots are frequency division multiplexed in each symbol period;
    multiplexing data symbols in each data symbol stream onto the slots allocated to the data symbol stream and pilot symbols onto the slots allocated to the pilot symbols;
    forming a composite symbol stream with multiplexed data symbols for the plurality of data symbol streams and pilot symbols, wherein the plurality of data symbol streams are independently recoverable by a receiver;
    forming a plurality M interlaces with U frequency subbands usable for transmission of the composite symbol stream, where U >1 and each interlace comprises a different set of uniformly distributed frequency subbands selected from among the U frequency subbands so that each of the U frequency subbands belongs to only one interlace and consecutive subbands in each set are spaced apart by M subbands; and
    mapping the plurality of slots in each symbol period to the plurality of interlaces for transmitting the composite symbol stream so that interlaces used for pilot transmission have varying distances to interlaces used for data transmission.

2. The method of claim 1, wherein the forming the plurality of interlaces comprises forming the plurality of interlaces with equal number of frequency subbands.

3. The method of claim 1, wherein the plurality of interlaces comprises forming the plurality of interlaces with the frequency subbands in each interlace being interlaced with the frequency subbands in each of remaining interlaces.

4. The method of claim 1, wherein the forming the plurality of interlaces comprises:
    forming a plurality of groups of frequency subbands, each group including frequency subbands uniformly distributed across T total frequency subbands in the system, where $T \geqq U$; and
    forming each interlace with frequency subbands selected from a respective group of frequency subbands.

5. The method of claim 1, wherein the allocating slots to each of the plurality of data symbol streams comprises allocating each of the plurality of interlaces to one data symbol stream, if it all, in each symbol period.

6. The method of claim 1, wherein the plurality of slots in each symbol period are identified by slot indices, the method further comprising:
    for each symbol period, mapping the slot indices to the plurality of interlaces based on a mapping scheme.

7. The method of claim 6, wherein the mapping the slot indices to the plurality of interlaces comprises mapping each slot index used for data transmission to different ones of the plurality of interlaces in different symbol periods.

8. The method of claim 1, further comprising:
    distributing data symbols multiplexed onto each allocated slot across the frequency subbands in the interlace to which the slot is mapped.

9. The method of claim 8, wherein the distributing the data symbols multiplexed onto each allocated slot comprises distributing data symbols for each data packet sent in the slot across the frequency subbands in the interlace to which the slot is mapped.

10. The method of claim 1, further comprising:
    selecting slots for pilot transmission from among the plurality of slots in each symbol period; and
    multiplexing pilot symbols onto the slots used for pilot transmission.

11. The method of claim 10, further comprising:
    mapping the slots used for pilot transmission to different interlaces in different symbol periods.

12. The method of claim 6, further comprising:
    allocating at least one slot index for pilot transmission; and
    allocating remaining slot indices for data transmission.

13. The method of claim 12, further comprising:
    mapping the at least one slot index used for pilot transmission to at least one interlace; and
    mapping each slot index used for data transmission to different interlaces in different symbol periods.

14. The method of claim 1, further comprising:
    processing a plurality of data streams to obtain the plurality of data symbol streams, one data symbol stream for each data stream.

15. The method of claim 1, wherein the allocating the slots to each of the plurality of data symbol streams comprises allocating a particular number of slots to each data symbol stream based on at least one packet size and at least one coding and modulation scheme used for the data symbol stream.

16. The method of claim 14, wherein the processing the plurality of data streams comprises:
  encoding data packets for each data stream in accordance with a coding scheme to generate coded packets for the data stream; and
  modulating the coded packets for each data stream in accordance with a modulation scheme to generate data symbols for the corresponding data symbol stream.

17. The method of claim 14,
  wherein the encoding the data packets for each data stream comprises encoding an integer number of data packets for each data stream in each frame of a time period; and
  wherein the allocating the slots to each of the plurality of data symbol streams comprises allocating an integer number of slots to each data symbol stream in each frame based on the number of data packets being transmitted in the frame for the corresponding data stream.

18. The method of claim 1, wherein the allocating the slots to each of the plurality of data symbol streams comprises allocating each data symbol stream a particular number of slots determined by decoding constraint and a coding and modulation scheme used for the data symbol stream.

19. A method of transmitting data in a wireless multi-carrier communication system, comprising:
  allocating slots to each of a plurality of data symbol streams and pilot symbols, wherein each slot is a unit of transmission and a plurality of slots are frequency division multiplexed in each symbol period;
  multiplexing data symbols in each data symbol stream onto the slots allocated to the data symbol stream and pilot symbols onto the slots allocated to the pilot symbols;
  forming a composite symbol stream with multiplexed data symbols for the plurality of data symbol streams and pilot symbols, wherein the plurality of data symbol streams are independently recoverable by a receiver; and
  forming 2N interlaces with a plurality of frequency subbands usable for transmission the composite symbol stream, where N>1 and each interlace comprises a different set of uniformly distributed frequency subbands selected from among the plurality of frequency subbands so that each of the plurality of subbands belongs to only one interlace and consecutive subbands in each set are spaced apart by 2N subbands; and
  mapping the plurality of slots in each symbol period to the 2N interlaces for transmitting the composite symbol stream so that interlaces used for pilot transmission have varying distances to interlaces used for data transmission.

20. The method of claim 19, wherein N is equal to 1, 2, 3 or 4.

21. An apparatus in a wireless multi-carrier communication system, comprising:
  a controller operative to allocate slots to each of a plurality of data symbol streams and pilot symbols, wherein each slot is a unit of transmission and a plurality of slots are frequency division multiplexed in each symbol period; and
  a data processor operative to multiplex data symbols in each data symbol stream and pilot symbols onto the slots allocated to the data symbol stream and pilot symbols to form a composite symbol stream, wherein the plurality of data symbol streams are independently recoverable by a receiver;
  wherein the controller is further operative to form a plurality M interlaces with U frequency subbands usable for transmission of the composite symbol stream, where U >1 and each interlace comprises a different set of uniformly distributed frequency subbands selected from among the U frequency subbands so that each of the U frequency subbands belongs to only one interlace and consecutive subbands in each set are spaced apart by M subbands; and
  wherein the plurality of slots in each symbol period are identified by slot indices, and wherein the data processor is further operative to, for each symbol period, map the slot indices to the plurality M of interlaces based on a mapping scheme so that interlaces used for pilot transmission have varying distances to interlaces used for data transmission.

22. The apparatus of claim 21, wherein the controller is further operable to form the plurality of interlaces with equal number of frequency subbands.

23. The apparatus of claim 21, wherein the controller is further operable to form the plurality of interlaces with the frequency subbands in each interlace being interlaced with the frequency subbands in each of remaining interlaces.

24. The apparatus of claim 21, wherein to form the plurality of interlaces, the controller is further operable to
  form a plurality of groups of frequency subbands, each group including frequency subbands uniformly distributed across T total frequency subbands in the system, where $T \geqq U$; and
  form each interlace with frequency subbands selected from a respective group of frequency subbands.

25. The apparatus of claim 21, wherein to allocate slots to each of the plurality of data symbol streams, the controller further operative to allocate each of the plurality of interlaces to one data symbol stream, if at all, in each symbol period.

26. The apparatus of claim 21, wherein the processor is further operative to map each slot index used for data transmission to different ones of the plurality of interlaces in different symbol periods.

27. The apparatus of claim 21, wherein the processor is further operative to distribute data symbols multiplexed onto each allocated slot across the frequency subbands in the interlace to which the slot is mapped.

28. The apparatus of claim 27, wherein to distribute the data symbols multiplexed onto each allocated slot, the processor is further operative to distribute data symbols for each data packet sent in the slot across the frequency subbands in the interlace to which the slot is mapped.

29. The apparatus of claim 21,
  wherein the controller is further operative to select slots for pilot transmission from among the plurality of slots in each symbol period; and
  wherein the data processor is further operative to multiplex pilot symbols onto the slots used for pilot transmission.

30. The apparatus of claim 29, wherein the controller is further operative to map the slots used for pilot transmission to different interlaces in different symbol periods.

31. The apparatus of claim 21, wherein the controller further operative to:
  allocate at least one slot index for pilot transmission; and
  allocate remaining slot indices for data transmission.

32. The apparatus of claim 31, wherein the controller further operative to:
  map the at least one slot index used for pilot transmission to at least one interlace; and
  map each slot index used for data transmission to different interlaces in different symbol periods.

33. The apparatus of claim 21, wherein the controller further operative to process a plurality of data streams to obtain the plurality of data symbol streams, one data symbol stream for each data stream.

34. The apparatus of claim 21, wherein the controller is further operative to allocate a particular number of slots to each data symbol stream based on at least one packet size and at least one coding and modulation scheme used for the data symbol stream.

35. The apparatus of claim 33, wherein to process the plurality of data streams, the controller is further operative to:
encode data packets for each data stream in accordance with a coding scheme to generate coded packets for the data stream; and
modulate the coded packets for each data stream in accordance with a modulation scheme to generate data symbols for the corresponding data symbol stream.

36. The apparatus of claim 35,
wherein the controller is further operative to allocate an integer number of slots to each data symbol stream in each frame based on the number of data packets being transmitted in the frame for the corresponding data stream; and
wherein the processor is further operative to encode an integer number of data packets for each data stream in each frame of a time period.

37. The apparatus of claim 21, wherein the controller is further operative to allocate each data symbol stream a particular number of slots determined by decoding constraint and a coding and modulation scheme used for the data symbol stream.

38. An apparatus in a wireless multi-carrier communication system, comprising:
a controller operative to allocate slots to each of a plurality of data symbol streams, wherein each slot is a unit of transmission and a plurality of slots are frequency division multiplexed in each symbol period;
a data processor operative to multiplex data symbols in each data symbol stream onto the slots allocated to the data symbol stream and to form a composite symbol stream, wherein the plurality of data symbol streams are independently recoverable by a receiver;
wherein the controller is further operative to select slots for pilot transmission from among the plurality of slots in each symbol period, and wherein the data processor is further operative to multiplex pilot symbols onto the slots used for pilot transmission; and
wherein the controller is further operative to form a plurality M interlaces comprising different sets of uniformly distributed frequency subbands U usable for transmission of the pilot symbols and the data symbol streams in the allocated slots, where each of the frequency subbands U belongs to only one interlace and consecutive subbands in each set are spaced apart by M subbands.

39. An apparatus in a wireless multi-carrier communication system, comprising:
a controller operative to allocate slots to each of a plurality of data symbol streams, wherein each slot is a unit of transmission and a plurality of slots are frequency division multiplexed in each symbol period;
a data processor operative to multiplex data symbols in each data symbol stream onto the slots allocated to the data symbol stream and to form a composite symbol stream with multiplexed data symbols for the plurality of data symbol streams, wherein the plurality of data symbol streams are independently recoverable by a receiver;
wherein the controller is further operative to allocate a particular number slots to each data symbol stream based on at least one packet size and at least one coding and modulation scheme used for the data symbol stream; and
wherein the controller is further operative to form a plurality M interlaces comprising different sets of uniformly distributed frequency subbands U usable for transmission of each of a plurality of data symbol streams in the allocated slots, where each of the frequency subbands U belongs to only one interlace and consecutive subbands in each set are spaced apart by M subbands.

40. An apparatus in a wireless multi-carrier communication system, comprising:
a controller operative to allocate slots to each of a plurality of data symbol streams, wherein each slot is a unit of transmission and a plurality of slots are frequency division multiplexed in each symbol period;
a data processor operative to multiplex data symbols in each data symbol stream onto the slots allocated to the data symbol stream and to form a composite symbol stream with multiplexed data symbols for the plurality of data symbol streams, wherein the plurality of data symbol streams are independently recoverable by a receiver;
wherein the data processor is further operative to process a plurality of data streams to obtain the plurality of data symbol streams, one data symbol stream for each data stream; and
wherein the controller is further operative to form a plurality M interlaces comprising different sets of uniformly distributed frequency subbands U usable for transmission of each of a plurality of data symbol streams in the allocated slots where each of the frequency subbands U belongs to only one interlace and consecutive subbands in each set are spaced apart by M subbands.

41. An apparatus in a wireless multi-carrier communication system, comprising:
a controller operative to allocate slots to each of a plurality of data symbol streams, wherein each slot is a unit of transmission and a plurality of slots are frequency division multiplexed in each symbol period;
a data processor operative to multiplex data symbols in each data symbol stream onto the slots allocated to the data symbol stream and to form a composite symbol stream with multiplexed data symbols for the plurality of data symbol streams, wherein the plurality of data symbol streams are independently recoverable by a receiver;
wherein the controller is further operative to form a plurality M interlaces comprising different sets of uniformly distributed frequency subbands U usable for transmission of each of a plurality of data symbol streams in the allocated slots, where each of the frequency subbands U belongs to only one interlace and consecutive subbands in each set are spaced apart by M subbands; and
wherein the wireless multi-carrier communication system utilizes orthogonal frequency division multiplexing (OFDM).

42. An apparatus in a wireless multi-carrier communication system, comprising:
a controller operative to allocate slots to each of a plurality of data symbol streams, wherein each slot is a unit of transmission and a plurality of slots are frequency division multiplexed in each symbol period;
a data processor operative to multiplex data symbols in each data symbol stream onto the slots allocated to the data symbol stream and to form a composite symbol stream with multiplexed data symbols for the plurality of data symbol streams, wherein the plurality of data symbol streams are independently recoverable by a receiver;
wherein the controller is further operative to form a plurality M interlaces comprising different sets of uniformly distributed frequency subbands U usable for transmission of each of a plurality of data symbol streams in the allocated slots, where each of the frequency subbands U belongs to only one interlace and consecutive subbands in each set are spaced apart by M subbands; and wherein the wireless multi-carrier communication system is a broadcast system.

43. An apparatus in a wireless multi-carrier communication system, comprising:

means for allocating slots to each of a plurality of data symbol streams and pilot symbols, wherein each slot is a unit of transmission and a plurality of slots are frequency division multiplexed in each symbol period;

means for multiplexing data symbols in each data symbol stream and pilot symbols onto the slots allocated to the data symbol stream and slots allocated to the pilot symbols;

means for forming a composite symbol stream with multiplexed data symbols for the plurality of data symbol streams and pilot symbols, wherein the plurality of data symbol streams are independently recoverable by a receiver;

means for forming a plurality M interlaces with U frequency subbands usable for transmission of the composite symbol stream, where U >1 and each interlace comprises a different set of uniformly distributed frequency subbands selected from among the U frequency subbands so that each of the U subbands belongs to only one interlace and consecutive subbands in the set are spaced apart by M subbands; and means for mapping the plurality of slots in each symbol period to the plurality of interlaces for transmitting of the composite symbol stream so that interlaces used for pilot transmission have varying distances to interlaces used for data transmission.

44. The apparatus of claim 43, wherein the plurality of slots in each symbol period are identified by slot indices, the apparatus further comprising:

means for mapping the slot indices to the plurality of interlaces for each symbol period based on a mapping scheme.

45. The apparatus of claim 43, further comprising:

means for selecting slots for pilot transmission from among the plurality of slots in each symbol period; and means for multiplexing pilot symbols onto the slots used for pilot transmission.

46. The apparatus of claim 43, further comprising:

means for processing a plurality of data streams to obtain the plurality of data symbol streams, one data symbol stream for each data stream.

47. The apparatus of claim 43, wherein means for forming the plurality of interlaces comprises means for forming the plurality of interlaces with equal number of frequency subbands.

48. The apparatus of claim 43, wherein means for forming the plurality of interlaces comprises means for forming the plurality of interlaces with the frequency subbands in each interlace being interlaced with the frequency subbands in each of remaining interlaces.

49. The apparatus of claim 43, wherein means for forming the plurality of interlaces comprises:

means for forming a plurality of groups of frequency subbands, each group including frequency subbands uniformly distributed across T total frequency subbands in the system, where $T \geq U$; and means for forming each interlace with frequency subbands selected from a respective group of frequency subbands.

50. The apparatus of claim 43, wherein means for allocating slots to each of the plurality of data symbol streams comprises means for allocating each of the plurality of interlaces to one data symbol stream, if at all, in each symbol period.

51. The apparatus of claim 44, wherein means for mapping the slot indices to the plurality of interlaces comprises means for mapping each slot index used for data transmission to different ones of the plurality of interlaces in different symbol periods.

52. The apparatus of claim 43, further comprising:

means for distributing data symbols multiplexed onto each allocated slot across the frequency subbands in the interlace to which the slot is mapped.

53. The apparatus of claim 52, wherein means for distributing the data symbols multiplexed onto each allocated slot comprises means for distributing data symbols for each data packet sent in the slot across the frequency subbands in the interlace to which the slot is mapped.

54. The apparatus of claim 45, further comprising:

means for mapping the slots used for pilot transmission to different interlaces in different symbol periods.

55. The apparatus of claim 44, further comprising:

means for allocating at least one slot index for pilot transmission; and means for allocating remaining slot indices for data transmission.

56. The apparatus of claim 55, further comprising:

means for mapping the at least one slot index used for pilot transmission to at least one interlace; and means for mapping each slot index used for data transmission to different interlaces in different symbol periods.

57. The apparatus of claim 43, wherein means for allocating the slots to each of the plurality of data symbol streams comprises means for allocating a particular number of slots to each data symbol stream based on at least one packet size and at least one coding and modulation scheme used for the data symbol stream.

58. The apparatus of claim 46, wherein means for processing the plurality of data streams comprises:

means for encoding data packets for each data stream in accordance with a coding scheme to generate coded packets for the data stream; and means for modulating the coded packets for each data stream in accordance with a modulation scheme to generate data symbols for the corresponding data symbol stream.

59. The apparatus of claim 46, wherein means for encoding the data packets for each data stream comprises means for encoding an integer number of data packets for each data stream in each frame of a time period; and wherein means for allocating the slots to each of the plurality of data symbol streams comprises means for allocating an integer number of slots to each data symbol stream in each frame based on the number of data packets being transmitted in the frame for the corresponding data stream.

60. The apparatus of claim 43, wherein means for allocating the slots to each of the plurality of data symbol streams comprises means for allocating each data symbol stream a particular number of slots determined by decoding constraint and a coding and modulation scheme used for the data symbol stream.

61. A method of receiving data in a wireless multi-carrier communication system, comprising:

selecting at least one data stream for recovery from among a plurality of data streams transmitted by a transmitter in the system using a plurality M interlaces with U frequency subbands, where U >1 and each interlace comprises a different set of uniformly distributed frequency subbands selected by the transmitter from among the U frequency subbands so that each of the U subbands belongs to only one interlace and consecutive subbands in the set are spaced apart by M subbands;

determining slots used for each selected data stream, wherein each slot is a unit of transmission and a plurality of slots are frequency division multiplexed in each symbol period, wherein data symbols for each of the plurality of data streams are multiplexed onto slots allocated to the data stream, and wherein the plurality of data streams are independently recoverable by a receiver;

multiplexing detected data symbols obtained for slots used for each selected data stream onto a detected data symbol stream, wherein each detected data symbol is an estimate of a data symbol and at least one detected data symbol stream is obtained for the at least one data stream selected for recovery; and processing each detected data symbol stream to obtain a corresponding decoded data stream.

62. The method of claim 61, wherein the plurality of slots in each symbol period are identified by slot indices, and wherein the mapping the plurality of slots in each symbol period comprises mapping the slot indices to the plurality of interlaces in each symbol period based on a mapping scheme.

63. The method of claim 61, further comprising:

performing a partial Fourier transform for each slot used for each selected data stream to obtain received data symbols for the slot, the partial Fourier transform being a Fourier transform for fewer than all frequency subbands in the system; and performing detection on the received data symbols for each slot used for each selected data stream to obtain detected symbols for the slot.

64. The method of claim 61, further comprising:

performing a partial Fourier transform for each slot used for pilot transmission to obtain a channel estimate for the slot.

65. The method of claim 64, further comprising:

deriving a channel estimate for each slot used for each selected data stream based on channel estimates obtained from slots used for pilot transmission.

66. An apparatus in a wireless multi-carrier communication system, comprising:

a controller operative to select at least one data stream for recovery from among a plurality of data streams transmitted by a transmitter in the system and to determine slots used for each selected data stream, wherein each slot is a unit of transmission and a plurality of slots are frequency division multiplexed in each symbol period, wherein data symbols for each of the plurality of data streams are multiplexed onto slots allocated to the data stream, and wherein the plurality of data streams are independently recoverable by a receiver;

a data processor operative to multiplex detected data symbols obtained for slots used for each selected data stream onto a detected data symbol stream and to process each detected data symbol stream to obtain a corresponding decoded data stream, wherein each detected data symbol is an estimate of a data symbol and at least one detected data symbol stream is obtained for the at least one data stream selected for recovery; and wherein the controller is further operable to map the plurality of slots in each symbol period to a plurality M interlaces formed with U frequency subbands used for transmission of data streams by the transmitter, where U >1 and each interlace comprises a different set of uniformly distributed frequency subbands selected from among the U frequency subbands so that each of the U subbands belongs to only one interlace and consecutive subbands in the set are spaced apart by M subbands.

67. The apparatus of claim 66, further comprising:

a demodulator operative to perform a partial Fourier transform for each slot used for each selected data stream to obtain received data symbols for the slot and to perform detection on the received data symbols for each slot used for each selected data stream to obtain detected symbols for the slot.

68. An apparatus in a wireless multi-carrier communication system, comprising:

means for selecting at least one data stream for recovery from among a plurality of data streams transmitted by a transmitter in the system;

means for determining slots used for each selected data stream, wherein each slot is a unit of transmission and a plurality of slots are frequency division multiplexed in each symbol period, wherein data symbols for each of the plurality of data streams are multiplexed onto slots allocated to the data stream, and wherein the plurality of data streams are independently recoverable by a receiver;

means for multiplexing detected data symbols obtained for slots used for each selected data stream onto a detected data symbol stream, wherein each detected data symbol is an estimate of a data symbol and at least one detected data symbol stream is obtained for the at least one data stream selected for recovery;

means for processing each detected data symbol stream to obtain a corresponding decoded data stream; and means for mapping the plurality of slots in each symbol period to a plurality M interlaces formed with U frequency subbands used for transmission of data streams by the transmitter, where U >1 and each interlace comprises a different set of uniformly distributed frequency subbands selected from among the U frequency subbands, so that each of the U subbands belongs to only one interlace and consecutive subbands in the set are spaced apart by M subbands.

69. The apparatus of claim 68, further comprising:

means for performing a partial Fourier transform for each slot used for each selected data stream to obtain received data symbols for the slot; and means for performing detection on the received data symbols for each slot used for each selected data stream to obtain detected symbols for the slot.

70. A computer program product embedded in a non-transitory computer readable storage medium containing a set of instructions for a processor to perform a method of managing mobile device operation, the medium comprising instructions for:

allocating slots to each of a plurality of data symbol streams, wherein each slot is a unit of transmission and a plurality of slots are frequency division multiplexed in each symbol period;

multiplexing data symbols in each data symbol stream onto the slots allocated to the data symbol stream;

forming a composite symbol stream with multiplexed data symbols for the plurality of data symbol streams, wherein the plurality of data symbol streams are independently recoverable by a receiver;

forming a plurality of M interlaces with U frequency subbands usable for transmission of at least data symbols of the composite symbol stream, where U >1 and each interlace comprises a different set of uniformly distributed frequency subbands selected from among the U frequency subbands so that each of the U subbands belongs to only one interlace and consecutive subbands in the set are spaced apart by M subbands; and mapping the plurality of slots in each symbol period to the plurality of interlaces for transmitting at least data symbols of the composite symbol stream so that interlaces used for pilot transmission have varying distances to interlaces used for data transmission.

71. The medium of claim 70, wherein the instructions for forming the plurality of interlaces comprises instructions for forming the plurality of interlaces with equal number of frequency subbands.

72. The medium of claim 70, wherein the instructions for forming the plurality of interlaces comprises instructions for forming the plurality of interlaces with the frequency subbands in each interlace being interlaced with the frequency subbands in each of remaining interlaces.

73. The medium of claim 70, wherein the instructions for forming the plurality of interlaces comprises instructions for:
forming a plurality of groups of frequency subbands, each group including frequency subbands uniformly distributed across T total frequency subbands in the system, where T ≧U; and
forming each interlace with frequency subbands selected from a respective group of frequency subbands.

74. The medium of claim 70, wherein the instructions for allocating slots to each of the plurality of data symbol streams comprises instructions for allocating each of the plurality of interlaces to one data symbol stream, if at all, in each symbol period.

75. The medium of claim 70, wherein the plurality of slots in each symbol period are identified by slot indices, the medium further comprising instructions for:
for each symbol period, mapping the slot indices to the plurality of interlaces based on a mapping scheme.

76. The medium of claim 70, further comprising instructions for:
distributing data symbols multiplexed onto each allocated slot across the frequency subbands in the interlace to which the slot is mapped.

77. The medium of claim 76, wherein the instructions for distributing the data symbols multiplexed onto each allocated slot comprises instructions for distributing data symbols for each data packet sent in the slot across the frequency subbands in the interlace to which the slot is mapped.

78. The medium of claim 70, further comprising instructions for:
selecting slots for pilot transmission from among the plurality of slots in each symbol period; and
multiplexing pilot symbols onto the slots used for pilot transmission.

79. The medium of claim 78, further comprising instructions for:
mapping the slots used for pilot transmission to different interlaces in different symbol periods.

80. The medium of claim 78, further comprising instructions for:
mapping the plurality of slots in each symbol period to the plurality of interlaces such that interlaces used for pilot transmission have varying distances to interlaces used for data transmission.

81. The medium of claim 75, further comprising instructions for:
allocating at least one slot index for pilot transmission; and
allocating remaining slot indices for data transmission.

82. The medium of claim 81, further comprising instructions for:
mapping the at least one slot index used for pilot transmission to at least one interlace; and
mapping each slot index used for data transmission to different interlaces in different symbol periods.

83. The medium of claim 70, further comprising instructions for:
processing a plurality of data streams to obtain the plurality of data symbol streams, one data symbol stream for each data stream.

84. The medium of claim 70, wherein the instructions for allocating the slots to each of the plurality of data symbol streams comprises instructions for allocating a particular number of slots to each data symbol stream based on at least one packet size and at least one coding and modulation scheme used for the data symbol stream.

85. The medium of claim 83, wherein the instructions for processing the plurality of data streams comprises instructions for:
encoding data packets for each data stream in accordance with a coding scheme to generate coded packets for the data stream; and
modulating the coded packets for each data stream in accordance with a modulation scheme to generate data symbols for the corresponding data symbol stream.

86. The medium of claim 83,
wherein the instructions for encoding the data packets for each data stream comprises instructions for encoding an integer number of data packets for each data stream in each frame of a time period; and
wherein the instructions for allocating the slots to each of the plurality of data symbol streams comprises instructions for allocating an integer number of slots to each data symbol stream in each frame based on the number of data packets being transmitted in the frame for the corresponding data stream.

87. The medium of claim 70, wherein the instructions for allocating the slots to each of the plurality of data symbol streams comprises instructions for allocating each data symbol stream a particular number of slots determined by decoding constraint and a coding and modulation scheme used for the data symbol stream.

* * * * *